(12) United States Patent
Hill

(10) Patent No.: US 12,430,654 B2
(45) Date of Patent: Sep. 30, 2025

(54) SYSTEMS, METHODS, AND APPARATUSES FOR IMPLEMENTING A CONSUMER DATA AGGREGATION PLATFORM FOR SEAMLESS PRODUCT RECALL AND CONSUMER ALERT MANAGEMENT

(71) Applicant: Rescue Datam, Inc., Wilsonville, OR (US)

(72) Inventor: Eugene Hill, Wilsonville, OR (US)

(73) Assignee: Rescue Datam, Inc., Sheridan, WY (US)

( * ) Notice: Subject to any disclaimer, the term of this patent is extended or adjusted under 35 U.S.C. 154(b) by 871 days.

(21) Appl. No.: 17/185,265

(22) Filed: Feb. 25, 2021

(65) Prior Publication Data

US 2021/0264436 A1    Aug. 26, 2021

Related U.S. Application Data

(60) Provisional application No. 62/981,248, filed on Feb. 25, 2020.

(51) Int. Cl.
   *G06Q 30/014*    (2023.01)
   *G06F 16/2455*   (2019.01)
   (Continued)

(52) U.S. Cl.
   CPC ....... *G06Q 30/014* (2013.01); *G06F 16/2456* (2019.01); *G06Q 30/016* (2013.01); *H04L 67/55* (2022.05)

(58) Field of Classification Search
   CPC ................. G06Q 30/014; G06Q 30/016; G06F 16/2456; H04L 67/55; H04L 67/566; H04W 4/021
   See application file for complete search history.

(56) References Cited

U.S. PATENT DOCUMENTS

| 2009/0032589 A1* | 2/2009 | Bowlus ........... G06Q 30/06 235/383 |
| 2009/0144104 A1* | 6/2009 | Johnson ............ G06Q 30/014 705/303 |

(Continued)

OTHER PUBLICATIONS

Kumar, S. (2014). A knowledge based reliability engineering approach to manage product safety and recalls. Expert Systems with Applications, 41(11), 5323-5339. (Year: 2014).*

(Continued)

*Primary Examiner* — John S. Wasaff
(74) *Attorney, Agent, or Firm* — Elliott, Ostrander & Preston, P.C.

(57) ABSTRACT

Embodiments of the invention relate generally to the field of content distribution platforms, and more particularly, to systems, methods, and apparatuses for implementing a consumer data aggregation platform for seamless product recall and consumer alert management. For example, according to one embodiment there is a method performed by a consumer data aggregation platform having at least a processor and a memory therein being configurable to perform operations including: receiving product-related data at a database system communicably interfaced with a consumer data aggregation platform; receiving sales data at the database system identifying a consumer via a unique UserID identifying the consumer and a list of associated products purchased by the consumer; storing the product-related data and the sales data as distinct datasets in separate tables within a database system of the consumer aggregation platform; receiving a recall notification request to issue a product recall for a specified consumer product represented within the datasets of the consumer data aggregation platform; querying the datasets of the consumer data aggregation platform to identify records for each one of: (i) the specified consumer products, and (ii) consumers associated with transactions (Continued)

based on the specified consumer aggregation platform; extracting records for the specified consumer products and contact information for consumers associated with transactions based on the specified consumer product across the distinct datasets of the consumer data aggregation platform; joining the extracted records for the specified consumer product and contact information for consumers associated with transactions based on the specified consumer product into a single data set; and issuing the product recall by sending a push notification to consumers associated with transactions based on the specified consumer product.

18 Claims, 19 Drawing Sheets

(51) Int. Cl.
*G06Q 30/016* (2023.01)
*H04L 67/55* (2022.01)

(56) References Cited

U.S. PATENT DOCUMENTS

| | | | | |
|---|---|---|---|---|
| 2009/0204415 | A1* | 8/2009 | Baiera | G06Q 10/087 705/303 |
| 2009/0227877 | A1* | 9/2009 | Tran | A61B 5/021 600/483 |
| 2011/0093401 | A1* | 4/2011 | Waite | G06Q 30/06 705/303 |
| 2011/0258065 | A1* | 10/2011 | Fordyce, III | G06Q 30/0601 705/26.1 |
| 2012/0185399 | A1* | 7/2012 | Draper | G06Q 10/08 705/303 |
| 2013/0036061 | A1* | 2/2013 | Alexander | G06Q 30/014 705/303 |
| 2013/0282593 | A1* | 10/2013 | Merz | G06Q 30/0601 705/303 |
| 2014/0306826 | A1* | 10/2014 | Ricci | G08G 1/0968 340/573.1 |
| 2015/0032638 | A1* | 1/2015 | Dintenfass | G06Q 30/012 705/302 |
| 2015/0039438 | A1* | 2/2015 | Korus | G06Q 30/014 705/26.8 |
| 2015/0199741 | A1* | 7/2015 | Lucas | G06Q 30/0207 705/26.61 |
| 2016/0067547 | A1* | 3/2016 | Anthony | G01P 15/0891 702/141 |
| 2017/0236127 | A1* | 8/2017 | Tahir | G06Q 30/014 705/7.32 |
| 2018/0084380 | A1* | 3/2018 | Lucas | G06Q 50/01 |
| 2018/0253733 | A1* | 9/2018 | Lewis | H04W 4/80 |
| 2018/0262613 | A1* | 9/2018 | Drake | H04M 3/42051 |
| 2019/0051144 | A1* | 2/2019 | David | G08B 21/0415 |
| 2019/0287117 | A1* | 9/2019 | Danyluk | G06Q 30/014 |
| 2021/0265045 | A1* | 8/2021 | Elias | G16H 30/20 |

OTHER PUBLICATIONS

"Recalls Background and Definitions," accessed via Wayback Machine at https://web.archive.org/web/20191212054541/https://www.fda.gov/safety/industry-guidance-recalls/recalls-background-and-definitions. (Year: 2019).*

Wang, S., Li, D., Zhang, Y., & Chen, J. (2019). Smart contract-based product traceability system in the supply chain scenario. IEEE access, 7, 115122-115133. (Year: 2019).*

* cited by examiner

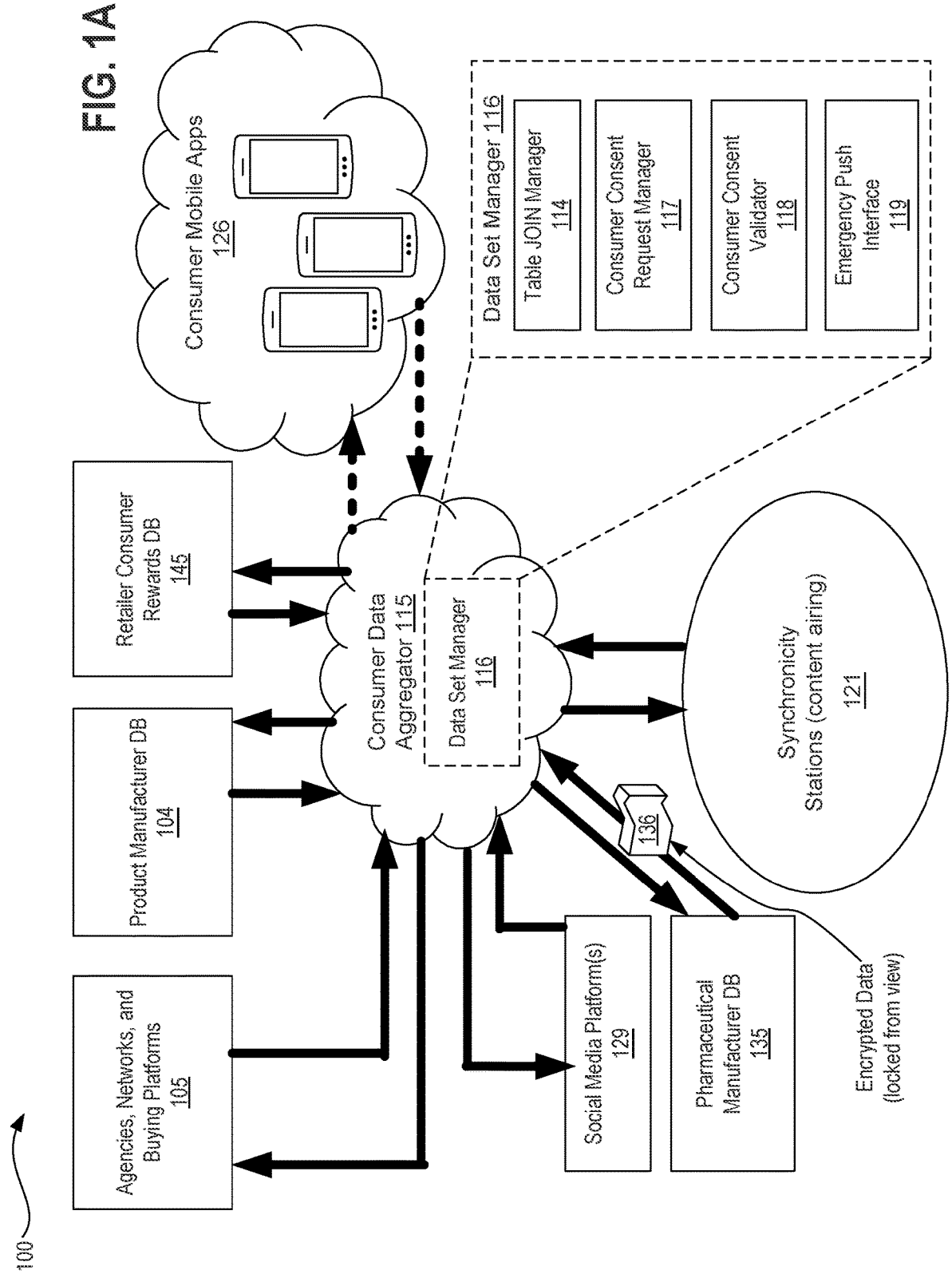

| Membership Cards/Purchases 301 | Activate Warranty/Poison Recall 302 (Check Yes/Blank No) | Pull From your Purchase List Advertising within in Geo-FenceArea ViaText/Radio/TV 303 | Request Auto Order Fill, Reminder, Reservation or Nothing 304 |
|---|---|---|---|
| Groceries Stores | ✓ | 1 miles | Auto Order By Date |
| Clothing Stores | | 20 miles | Reminder |
| Medical Devices | ✓ | 5 miles | |
| Medications/Pharmacy | ✓ | 1 miles | Auto Order By Geo-Fence |
| Airline/Hotels | ✓ | Book Reservations | Reservation |
| Cars/Appliances | ✓ | | |
| Gas Cards | | 20 miles | Reminder |
| Bank Cards | | | Reminder |
| Casino/Sports Teams | ✓ | | |
| Insurances | | | Reminder |
| National Emergency | | | |
| Other | | | |

FIG. 3A

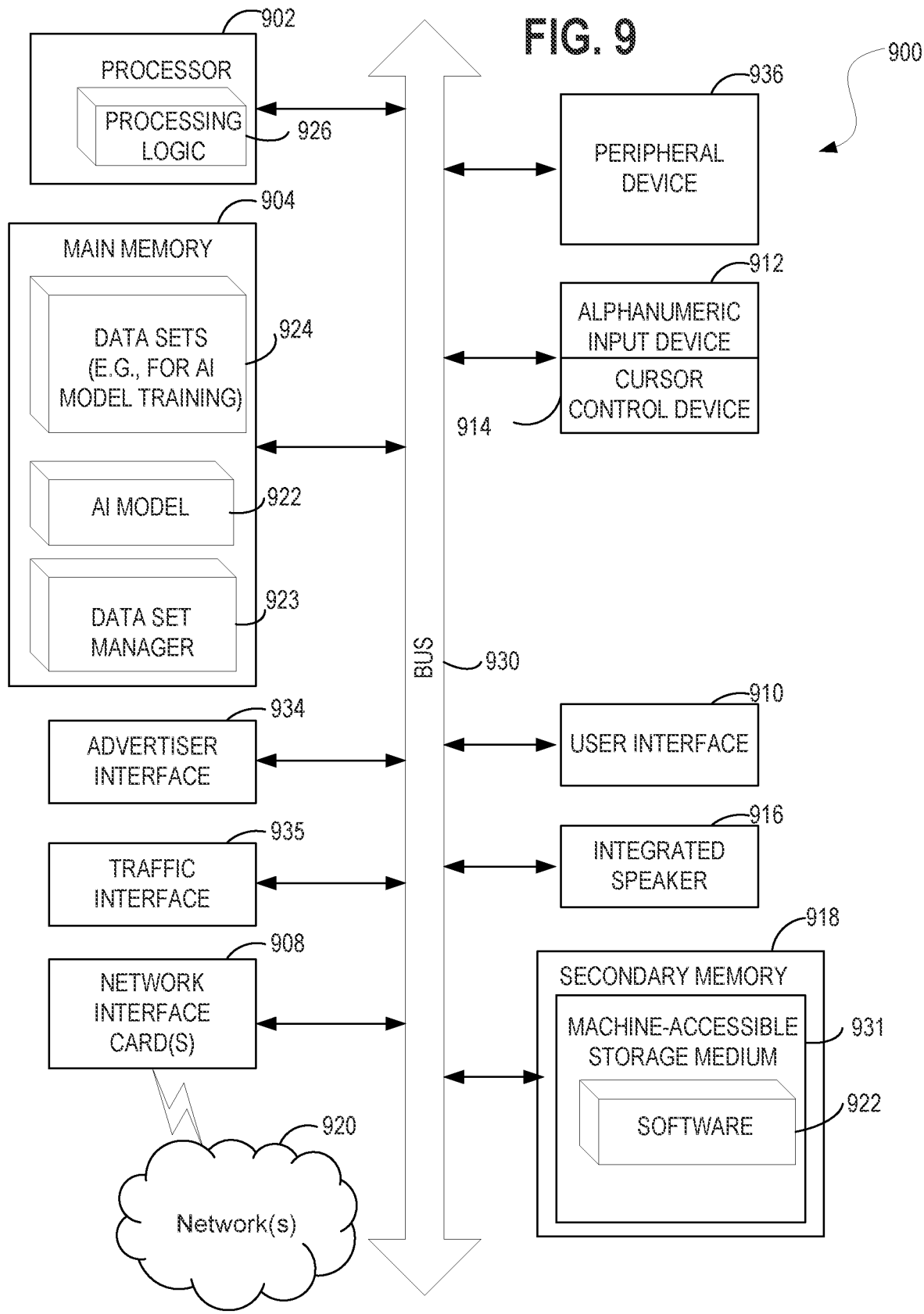

SYSTEMS, METHODS, AND APPARATUSES FOR IMPLEMENTING A CONSUMER DATA AGGREGATION PLATFORM FOR SEAMLESS PRODUCT RECALL AND CONSUMER ALERT MANAGEMENT

CLAIM OF PRIORITY

This U.S. Utility Patent Application is related to, and claims priority to, the U.S. Provisional Application No. 62/981,248 filed Feb. 25, 2020 entitled "SYSTEMS, METHODS, AND APPARATUSES FOR IMPLEMENTING A CONSUMER DATA AGGREGATION PLATFORM FOR SEAMLESS PRODUCT RECALL AND CONSUMER ALERT MANAGEMENT," the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of cloud computing and consumer alerts management, and more particularly, to systems, methods, and apparatuses for implementing a consumer data aggregation platform for seamless product recall and consumer alert management.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

There is a disconnect between consumers affected by product recalls and drug recalls and the ability for product manufacturers and government entities to identify and then notify those consumers of a particular product or drug recall. Certain registries or government agencies may notify consumers of product recalls, for example, via postal mail ("snail mail"), but often the addresses of consumers may not be accurate or consumers may not pay attention to such mailings, thus making verification that consumers received such notices difficult to prove. Likewise, many businesses desire the ability to target advertising to consumers based on their purchasing habits and preferences, by tailoring the method and time of advertisements in a way that is likely to result in increased sales.

The implementation of 5G mobile networks provides for the opportunity to expand consumer advertising, a massive market with global advertising revenue estimated to be near $540 billion in 2020. There is additionally an opportunity to improve consumer experience with various retailers and advertisers based on preferences and metadata associated with such consumers.

What is needed is a rapid and verifiable way to send customized product recall notifications and consent-based customized advertising to consumers.

The present state of the art may therefore benefit from systems, methods, and apparatuses for implementing a consumer data aggregation platform for seamless product recall and consumer alert management as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIG. 1A illustrates a system architecture of the consumer data aggregation platform which implements a Consumer Data Aggregator 115 for seamless product recall and consumer alert management in accordance with described embodiments;

FIG. 3A illustrates additional detail regarding data set sources and activation criteria for the consumer data aggregator platform, in accordance with described embodiments.

FIG. 9 illustrates a diagrammatic representation of a machine 900 in the exemplary form of a computer system, in accordance with one embodiment;

DETAILED DESCRIPTION

Figure 1B:
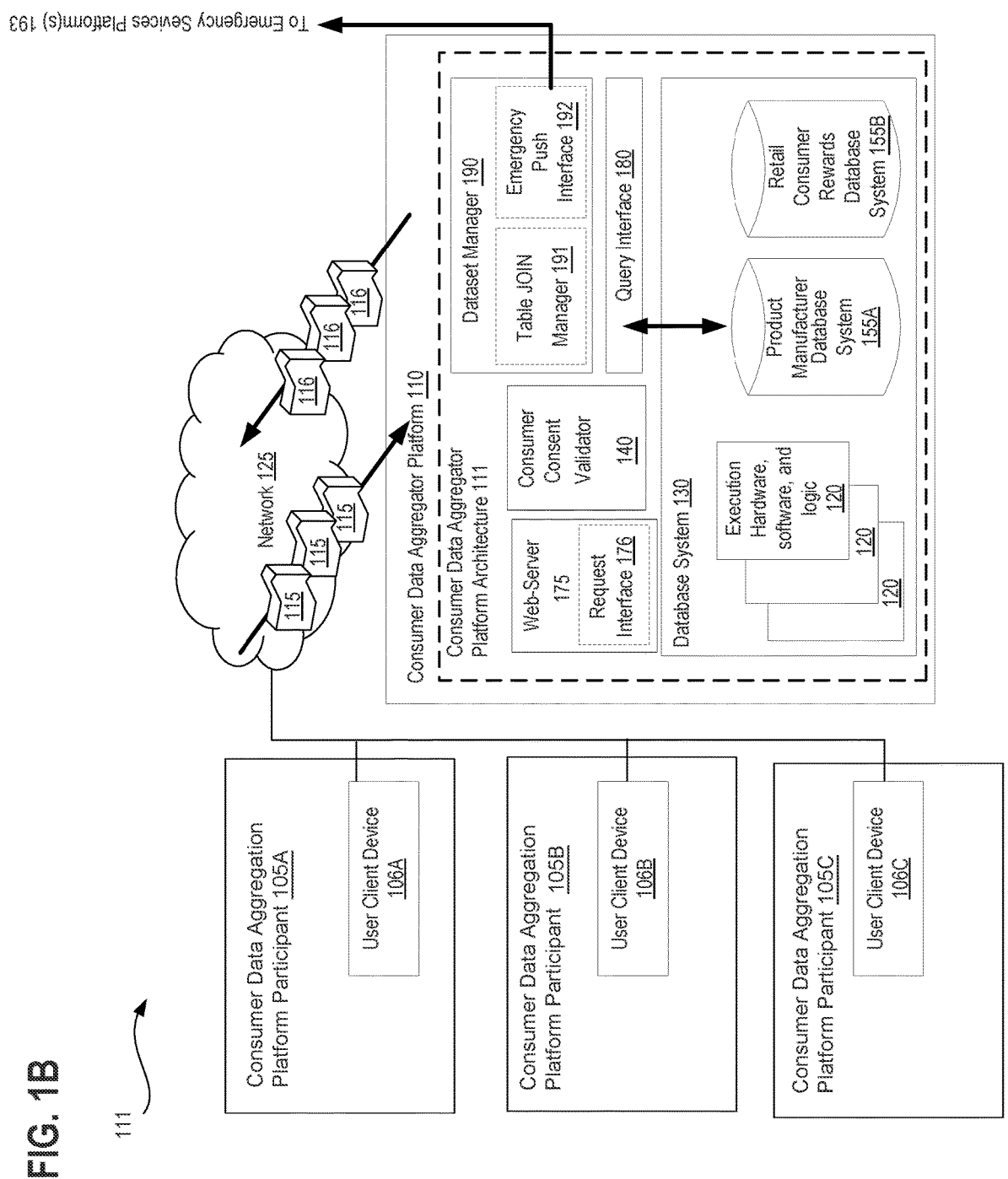
FIG. 1B illustrates an exemplary architecture, in accordance with described embodiments.

Described herein are methods and systems for implementing a consumer data aggregation platform for seamless product recall and consumer alert management as is described herein. According to a particular embodiment, there is a system having at least a processor and a memory therein being configurable to perform operations including: receiving product-related data at a database system communicably interfaced with a consumer data aggregation platform; receiving sales data at the database system identifying a consumer via a unique UserID identifying the consumer and a list of associated products purchased by the consumer; storing the product-related data and the sales data as distinct datasets in separate tables within a database system of the consumer aggregation platform; receiving a recall notification request to issue a product recall for a specified consumer product represented within the datasets of the consumer data aggregation platform; querying the datasets of the consumer data aggregation platform to identify records for each one of: (i) the specified consumer products, and (ii) consumers associated with transactions based on the specified consumer aggregation platform; extracting records for the specified consumer products and contact information consumers associated with transactions based on the specified consumer product across the distinct datasets of the consumer data aggregation platform; joining the extracted records for the specified consumer product and contact information for consumers associated with transactions based on the specified consumer product into a single data set; and issuing the product recall by sending a push notification to consumers associated with transactions based on the specified consumer product.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well-known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform. Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMS, EEPROMs, magnetic or optical cards, or any type of media suitable for storing non-transitory electronic instructions, each coupled to a computer system bus.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates a system architecture of the consumer data aggregation platform 100 which implements a Consumer Data Aggregator 115 for seamless product recall and consumer alert management in accordance with described embodiments.

As shown here, there is a cloud-based computing architecture which communicates with various external entities via a Wide Area Network (WAN) such as a public Internet. Centralized amongst the various entities is the Consumer Data Aggregator 115 having therein a data set manager 116. The Consumer Data Aggregator 115 communicatively interfaces with various external third party entities from which a variety of datasets are collected and aggregated at the Consumer Data Aggregator 115. For instance, the Consumer Data Aggregator 115 is communicatively interfaced with a product manufacturer database (DB) 104 as depicted here, from which information is collected at the Consumer Data Aggregator 115 platform describing, for example, details about consumer products, such as serial numbers, lot numbers, manufacture date, manufacture location, distributor IDs and for certain products, a "BOM" or "Bill of Materials" may be collected describing sub-parts and sub-components within a higher level finished goods product by a given product manufacturer. While there is a single product manufacturer database 110 depicted here, there would be many product manufacturer databases 104 from which data is collected and aggregated by the Consumer Data Aggregator 115. Similarly, there is depicted a pharmaceutical manufacturer database 135, from which the Consumer Data Aggregator 115 platform receives data describing manufactured drug lots, dates, distribution channels, retailers, etc.

Additionally depicted are the social media platforms 129 which are interfaced to the Consumer Data Aggregator 115 via which the platform may push notifications to consumers indirectly through the social media platforms 129 or from which the Consumer Data Aggregator 115 platform may receive information about consumer preferences and consumer activity.

Additionally depicted is the retailer consumer rewards DB 145 which provides information about consumers of various retailers, including the purchase history of consumers from, for example, a grocery store or a sporting goods store, etc. For example, if a consumer participates in the customer rewards program for a grocery store and then purchases certain canned goods from the grocery store, then that consumer's purchase of the canned goods will be linked with the consumer's identifying information via the consumers rewards program which is interfaced with the POS (Point of Sale) system of the grocery store. Later if there is a product recall for that particular canned goods product from the manufacturer, then the consumers who purchased that product from the retailer can be identified. Because that information will be received and stored by the Consumer Data Aggregator 115, a product manufacturer issuing a recall for the particular product (e.g., the canned goods in this example) can then rely upon the Consumer Data Aggregator 115 to identify the consumers that actually purchased that product and then a notification or alert may be issued to those consumers. Importantly, a consumer alert may be issued to the consumers directly based on their purchase history of that actual product, rather than having to rely solely upon news reports and general consumer awareness programs which do not target any individual specifically.

Further depicted are the agencies, networks, and buying platforms 105 which are communicatively interfaced with the Consumer Data Aggregator 115, via which advertisers may distribute marketing campaigns or via which government or regulatory agencies may distribute product recall notices or drug recall notices, via which automobile manufactures may distribute automobile recall notices, and via which other entities may initiate notices and alerts which are to be pushed to consumers by the Consumer Data Aggregator 115.

The Consumer Data Aggregator 115 executes a data set manager 116 via computer processing cores of the Consumer Data Aggregator 115 pursuant to instructions stored in a memory of the Consumer Data Aggregator 115 platform. The execution of the data set manager 116 operates a table JOIN manager 114 which is responsible for generating visualizations, working temporary tables having data joined or merged from multiple tables maintained by the Consumer Data Aggregator 115, or to generate JOIN data sets. The data set manager 116 maintains many isolated data sets from various sources, such as data sets originating from multiple product manufacturer DBs 104, from multiple pharmaceutical manufacturer DBs 135, from multiple social media platforms 130, and from multiple agencies, networks, and buying platforms 105.

Examples of agencies, networks, and buying platforms 105 may include, for example, data and information services business catering to a variety of industries such as automotive, healthcare, and other industries. For example, IHS Markit is such a business collecting data regarding products, sales, and consumers across the automotive supply chain including a massive database of vehicle registry information. IHS Markit was recently acquired by RL Polk. Another example is TraceLink Inc., the world's largest digital track and trace network for connecting medical device and pharmaceutical supply chains.

What such agencies, networks, and buying platforms 105 lack is a way to bridge the gap between the manufacturer and the end-consumer in product recall situations. This is especially important when time is of the essence in a recall due to a defective or unsuitable product being especially hazardous or fatal (such as toxic food products or car brake design defects that can result in serious bodily injury, death, and property damage). The current methods that manufacturers and retailers rely on to disseminate product recall information include traditional communication methods such as postal mail ("snail mail"), public service announcements in broadcasting, signs placed at retailers, and even e-mail. These are simply not efficient ways to disseminate product recalls to end-consumers. For example, many end-consumers may not receive product recall notices due to incorrect contact information, or they may receive and ignore such notices as junk mail. In certain product recall situations, the manufacturer may not even be able to identify the end-consumers, much less receive any form of confirmation that the end-consumers have been made aware of product recall notifications. Furthermore, product recall notifications are often not personalized to reach end-consumers actually affected by the product recall. Product recall notices are often disseminated in a blanket fashion and may often be sent to unaffected consumers, or consumers who bought a range of related but unaffected products or an unaffected version of a product when only a specific subset of a product is affected by the product recall.

Consider for example a product recall involving only a subset of lettuce products with certain barcodes or expiration dates. A purchaser of lettuce receiving a blanket lettuce product recall without information connecting the specific product they purchased to the recall may throw out the lettuce when in fact the product they purchased is not affected by the recall, for example, based on its barcode, expiration date, or other identifying features. Panic resulting in consumers throwing away, destroying, or returning products that may or may not be the specific product variation that is being recalled leads to food and product waste, as well as financial loss for the consumer, retailer, and manufacturer. Such situations may be avoided if product recalls are customized and targeted to the relevant end-consumers of a product.

The consumer data aggregation platform 100 offers solutions to these problems by bridging the gap between manufacturers, retailers, and end-consumers affected by a product recall. Consider for example a drug recall situation where a drug manufacturer may not know the end-consumer who purchased a drug from a retailer. The Consumer Data Aggregator 115 may interface with agencies such as TraceLink and retailers to trace the chain of product distribution from manufacture to end-consumers who bought or used a specific drug product, and then notify parties in this chain, particularly the end-consumers of product recalls via, for example, via an agency's product registry or retail membership card information from retailer databases.

Other applicable uses of the consumer data aggregator platform 100 include obtaining verification or confirmation of receipt of product recall notifications from end-consumers who were notified of the product recall. This would provide manufacturers and retailers with documentation that they performed due diligence regarding a product recall and this documentation may serve as a defense in potential litigation over the product recall.

According to certain embodiments, data sets are collected by the Consumer Data Aggregator 115 but maintained in an isolated state until such time that a particular event occurs which then requires the Consumer Data Aggregator 115 to pull information from multiple datasets and join them into a single data set in fulfillment of a consumer recall notification campaign, a consumer alert campaign, or a marketing campaign.

According to certain embodiments, data sets which are received at the Consumer Data Aggregator 115 are not acted upon, modified, searched, JOIN'd, or manipulated by the Consumer Data Aggregator 115 until a subsequent request is received by the Consumer Data Aggregator 115. For example, with the above example about the product recall for the canned goods, it may be that a recall is issued for the canned goods, and only at that time, will the Consumer Data Aggregator 115 platform trigger queries to search the retailer consumer rewards DB 145 originated data sets (at least those that are grocery retailers) for any consumers having purchased that particular canned good being recalled and then that data would be merged via a database JOIN operation with contact information and consumer contact preferences and consumer consent to receive such notifications to produce a list of consumers affected by the recall of the specific product in question which may be contacted, as well as contact information for the affected consumers.

In a related embodiment, there are siloed and isolated datasets for many grocery retailers stored at Consumer Data Aggregator 115 and the query search will be iterated across all of them and then the JOIN operation will pull the relevant affected consumers and their consent preferences and their contact information from multiple such datasets to form a large temporary JOIN table which may then be utilized to issue the product recall to the affected consumers.

In related embodiments, further operations may be utilized to produce the JOIN table, such as redundancy checks to eliminate duplicates in the event the same consumer purchased the same product from multiple different grocery stores or filtering and restrictions for the product in question on the basis of, for example, manufacturer lot codes, manufacturer dates of the product, manufacturer expiration codes, manufacturer distribution codes, and so forth. In such a way, only consumers affected by the relevant sub-set of purchases for a given product will be notified.

A similar example can be applied for the data sets originating from the pharmaceutical companies. For example, a diabetic insulin lot manufactured by pharmaceutical companies may have a problem and need to be recalled. Here the notices are more critical due to the health and safety concerns of the potentially affected patients and there are also privacy and regulatory issues that will arise, such as Health Insurance Portability and Accountability Act of 1996 (HIPAA) regulatory and statutory compliance issues.

Therefore, it is in accordance with certain embodiments that a dataset transmitted to the Consumer Data Aggregator 115 platform is transmitted as encrypted data 136 which is then received and stored by the consumer data aggregation platform 100, but in which the data subjected to such privacy concerns is locked from view by the Consumer Data Aggregator 115. In such a way, the consumer data aggregation platform 100 will receive and store the data, but have no ability to view, search, or manipulate the data. Likely, there will never be a use for such data, and the encrypted data 136 will simply never be accessed by the consumer data aggregation platform 100.

However, in the event of a drug recall or a medical device recall in the event of a medical device manufacturer (e.g., such as a recall of a titanium hip or pacemaker), then the pharmaceutical company may transmit a key to the Consumer Data Aggregator 115 via which to unlock and unencrypted the previously encrypted data 136, from which the data may then be searched and acted upon to trigger consumer and patient alerts for the drug recall or the medical device recall, presumably performed in a manner which complies with all applicable regulatory and statutory concerns.

Consider the further specifics for such an exemplary medical patient recall notice or alert. Once the Consumer Data Aggregator 115 has the data from the pharmaceutical company and receives an encryption key via which to unlock or un-encrypt the data, the pharmaceutical company may then search through data sets received from mail-order pharmacy retailers and brick and mortar retailers (e.g., such as Walgreen's, CVS Pharmacy, etc.) to perform a query and then JOIN operation based on consumers of the pharmacy retailers having received a particular drug which is subjected to the recall, pursuant to which medical patients affected by the recall; notice or alert may then be notified.

For a medical device, such as the titanium hip or the pace-maker, it may be that the data sets originate from hospitals, insurance providers, and doctor's offices, which specify that certain medical devices were surgically implanted into specified patients, and then, when and if necessary, such a medical device that is the subject of a recall may fulfill the notification requirement of the recall by having the consumer data aggregation platform 100 identify and notify the consumers affected.

Further depicted here is the consumer consent request manager 117 which executes via the consumer data aggregation platform's 100 data set manager 116 and is responsible for receiving and recording any consumer's consent or agreement to receive notifications. Sometimes consumer consent may be required or preferred. For example, in the case of advertising marketing campaigns, a requirement may be established that affirmative opt-in consent must be on record. In other instances, such as a product recall, it may be that consumer preferences are considered, but consumers are notified by default absent an opt-out preference managed and stored by the consumer consent request manager 117. In other examples, such as a product recall for a medical device or a drug recall, consumer preferences may be ignored or not required due to the criticality and urgency of the recall. Often, such recalls are administered pursuant to instruction by a government entity such as the FDA who will have the authority to issue such notices without consumer consent. In such an event, the consumer data aggregation platform 100 may facilitate these drug recall notifications and alerts to consumers on behalf of and at the direction of such a government request or at the request and direction of, for example, the drug manufacturer who is being instructed to issue such a recall by the FDA or some other government authority.

Further depicted is the consumer consent validator 118 which operates to validate whether or not consumer consent has been given, whether or not consumer consent is required, and whether or not a particular party requesting a consumer notification to be issued is covered by the consumer consent of record. For example, a company seeking to distribute a marketing campaign may not be covered by a certain consumer's of-record consent, whereas that same company when facilitating a product recall may be covered by the of-record consent, and thus, the consumer data aggregation platform 100 would permissibly distribute the consumer notifications on behalf of the company.

Additionally depicted within the data set manager 116 is an emergency push interface 119 which may be exposed to and made available to controlling authorities, such as government agencies, to issue, for example, drug recall alerts, consumer product alerts, AMBER alerts, emergency weather alerts, emergency evacuation alerts, and so forth. In such a way, the facilities of the consumer data aggregation platform 100 to contact consumers may be levered by appropriate government entities in the event of an emergency or critical and time-sensitive event to notify those consumers which are connected via the consumer data aggregation 100 platform's reach into consumer's mobile apps 126 or to notify consumers connected via the social media platforms 130, etc.

The Synchronicity stations 121 shown here provide the ability to distribute product recall and other consumer alerts to individuals by over-riding streamed or aired broadcast content utilizing the Synchronicity platform. For instance, if a consumer has the Synchronicity app installed to receive, for example, OTA radio broadcasts, then that consumer may be issued a notification via the Synchronicity content airing platform by either supplementing the consumer's personalized broadcast or by overriding whatever content is otherwise streaming via the consumer's personalized broadcast.

FIG. 1B illustrates an exemplary architecture, in accordance with described embodiments.

In one embodiment, a consumer data aggregation platform architecture 111 is communicably interfaced with a plurality of user client devices 106A-C (e.g., such as mobile devices, smart phones, tablets, PCs, etc.) through consumer data aggregation platform 110. The consumer data aggregation platform 110 is communicably interfaced with the user client devices 106A-C via network 125, for instance, over the public Internet. Consumer data aggregation platform participants 105A-C associated with each of the user devices 106A-C may be various consumers receiving product recall notices and other communications.

In one embodiment, the database system 130 includes product manufacturer database system 155A and retail consumer rewards database system 155B, for example, to store tables, datasets, and underlying database records with product data, consumer purchase and contact data, platform settings, pre-selected content, rewards points systems, etc., on behalf of consumer data aggregation platform participants 105A-C (e.g., consumers utilizing the consumer data aggregation platform 110).

Database system 130 includes a plurality of underlying hardware, software, and logic elements 120 that implement database functionality and a code execution environment within the consumer data aggregation platform 110. In accordance with one embodiment, database system 130 further implements product manufacturer database system 155A and retail consumer rewards database system 155B to service database queries and other data interactions with product manufacturer database system 155A and retail consumer rewards database system 155B in support of the consumer data aggregation platform as described herein. The hardware, software, and logic elements 120 of the database system 130 are separate and distinct from a plurality of consumer data aggregation platform participants (105A, 105B, and 105C) which utilize the services provided by the consumer data aggregation platform 110 by communicably interfacing to the consumer data aggregation platform 110 via network 125. In such a way, consumer data aggregation platform 110 may implement on-demand product recall notifications, on-demand database services in support of the consumer data aggregation platform, or cloud computing services implementing the consumer data aggregation platform 110 on behalf of consumer data aggregation platform participants 105A-C.

According to particular embodiments, the consumer data aggregation platform 110 integrates and communicates with emergency services (e.g., via public facing APIs or proprietary APIs). According to alternative embodiments, the consumer data aggregation platform 110 further integrates and communicates with retail sites.

In one embodiment, requests 115 are received at, or submitted to, a web-server 175 within consumer data aggregation platform 110. The consumer data aggregation platform 110 may receive a variety of requests for processing by the consumer data aggregation platform 110 and its administration of product recall notifications as described herein in conjunction with use of database system 130. Incoming requests 115 received at web-server 175 may specify which pre-selected content, and other configurable settings (e.g., displays, consumer consent, users, etc.) are to be applicable for any product recall request which is then implemented by the consumer data aggregation platform 110 as a series of query requests, search requests, status requests, database transactions, graphical user interface requests and interactions, processing requests to retrieve, update, or store data on behalf of one of the consumer data aggregation platform participants 105A-C, code execution requests, and so forth, in support of the consumer data aggregation platform as described herein.

Web-server 175 may be responsible for receiving requests 115 from various product manufacturers and retailers via network 125 and provide a web-based interface or other graphical displays to a user client device 106A-C or machine designated as the final recipient of such data requests 115.

The consumer data aggregation platform 110 may implement a request interface 176 via web-server 175 or as a stand-alone interface to receive requests packets or other requests 115 from product manufacturers and retailers. Request interface 176 further supports the sending of recall notification packets or other communications 116 in an outgoing direction from consumer data aggregation platform 110 to the user client devices 106A-C. Recall notification packets or other communications 116 sent from the consumer data aggregation platform 110 to the variously connected user devices 106A-C may constitute a variety of communications 116, such as requests for acknowledgement of receipt (e.g., where no action is taken but confirmation of a request is nevertheless provided by user client devices 106A-106C) or other interactive responses such as generation and presentment of GUI interfaces or other UX/UI and graphical overlays generated by the consumer data aggregation platform 110 and pushed to the user client devices 106A-106C for display, authentication challenges, targeted advertising content, etc. The displays at user client devices 106A-C may be customized to show select content depending on the user device. For example, according to certain embodiments, user client device 106A may not display product recalls if consumer data aggregation platform participant 105A has opted out of receiving such recalls or did not buy the product being recalled. Likewise, user client device 106B may only receive targeted advertising based on pre-specified preferences or settings configured by either user 106B or consumer data aggregation platform 110.

In certain embodiments, a client-server architecture may be utilized in which the consumer data aggregation platform 110 operates upon servers controlled by a particular organization, such as a government agency, emergency services, product manufacturer, or product retailer. In such an implementation, it may be desirable that communications between user client devices 106A-C and the consumer data aggregation platform architecture are transported via a WAN, LAN, WLAN, VPN, or other more restrictive communications network when compared with transport via the public Internet. Regardless of the networking architecture, interactions between the consumer data aggregation platform architecture 111 and the communicatively interfaced user client devices 106A-C would remain fundamentally the same.

Further depicted here is a consumer consent validator 140 which operates on behalf of the consumer data aggregation platform 110 to verify, authenticate, and otherwise credential consent given by consumer data aggregation platform participants 105A-C to receive product recall and other notifications (e.g., via their respective user client devices 106A-C or by other ways such as during product registration with the manufacturer). According to certain embodiments, consumer consent validator 140 may be overridden and product recall notifications issued to user client devices 106A-106C even when a consumer data aggregation platform participant has opted out or not specified preferences regarding receiving such recall notifications. This may occur, for example, if a product recall involves a product recall that poses a particular hazard to health and life such as poisonous or contaminated food products or fatally defective pharmaceuticals and medical devices.

Table JOIN manager 191 is responsible for generating visualizations, working temporary tables having data joined or merged from multiple tables maintained by the consumer data aggregation platform 110, or to generate JOIN data sets which bring together product manufacturing data, such as from product manufacturing database system 155A, and retail consumer data, such as from retail consumer rewards database system 155B.

Emergency push interface 192 may send notifications or confirmations to emergency service platform(s) 193 regarding product recalls and their status, as well as information about the transmission of product recalls to user client devices 106A-106C. Notifications pushed pursuant to emergency services may include, for instance, a notification triggered based on a geo-fence zone, such as one established for an area affected by a natural disaster or a crime scene or an industrial fire, etc. Such notifications may be triggered pursuant to requests from government entities which may communicate with the consumer data aggregation platform 110 via emergency push interface 192 which is an API and service exposed to and provided to authenticated and verified government entities.

According to certain embodiments, the consumer data aggregation platform 110 may be presented as an online website by the consumer data aggregation platform 110 for engagement with a group of third-party participants (such as consumer watchdog groups, retail promoters, governmental agencies, etc.) in tracking and disseminating product recalls and targeted advertising content.

Figure 2:
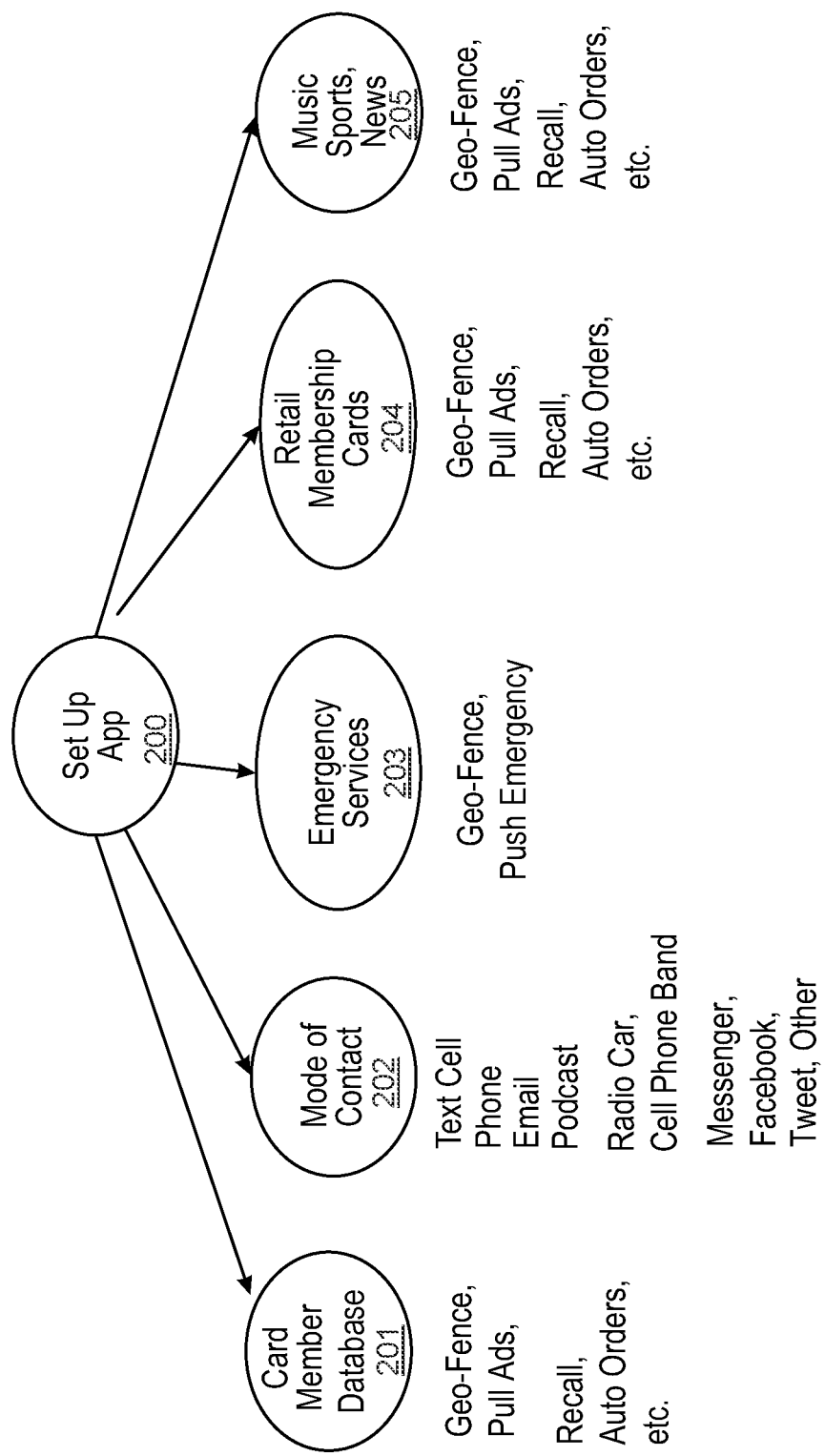
FIG. 2 illustrates additional detail regarding data set sources for the consumer data aggregation platform, in accordance with described embodiments.

FIG. 2 illustrates additional detail regarding data set sources for the consumer data aggregation platform, in accordance with described embodiments.

For instance, there is depicted here, a set-up application 200 which may be executed at a consumer mobile device, with such apps being installed from, for example, an Android App marketplace such as that provided by Google or an iStore app marketplace such as that provided by Apple. Nevertheless, customers may install an app via which they can then receive various consumer alerts, notifications, etc.

For instance, via the mobile app, the consumer may link their card-member database information 201 for various retailers (e.g., grocery store, sporting goods store, etc.). The consumer may further specify their consent and preferences via the mobile app. Based on these preferences, not only will the consumer be able to receive product recall notifications and various alerts (e.g., such as emergency alerts, etc.), but the consumer may also receive tailored notifications specific to their interests and behavior.

For example, the consumer may enter a geographic area identified by a geo-fence zone, pursuant to which, the consumer may trigger certain advertisements, recall notifications, trigger automated orders, and so forth.

For example, consider a consumer that has added grocery items such as bread and milk to their shopping list. If they enter a geographic region for a grocery store to which they are a rewards member, then the entry of that consumer's mobile device into an associated geo-fence zone may trigger a prompt to the consumer on their mobile device such as "Do you want to place an order with Grocery store XYZ which is 0.5 miles away for bread and milk from your shopping list?" Clicking "confirm" or "order" within the app would then automatically submit the order to the grocery store via the grocery store's curbside pickup service. The mobile app of the consumer may then further prompt the consumer to, for example, expect to pick up the submitted order in 5 minutes from "Grocery Store XYZ at curb-side marker location 12."

Such a function may be performed manually by the consumer through multiple different apps and many manual interactions or may be facilitated by the mobile app in a much more efficient and streamlined manner, which is to the benefit of both the consumer and the retailer. Furthermore, pre-purchase authorizations may be utilized to pay for the order, thus streamlining the process even further on behalf of the consumer. This strategy of sending relevant content and product suggestions based on consumer purchase history or consumer preferences is called pull advertising.

Additionally depicted here are various modes of contact 202 for the consumer. For example, further to the example above in which the consumer is prompted and notified via a mobile app installed on their mobile device, the consumer data aggregation platform 100 may issue notifications via SMS texts to a cell phone, via email, via a pod-cast utilizing the Synchronicity platform to augment a consumer's direct to air stream via a mobile device or to their vehicle, or to push notifications via cell phone band based messenger, or to push messages via social media platforms such as Facebook or Linked In, or via a tweet via Twitter.

Further depicted are notifications pushed pursuant to emergency services 203, for instance, a notification triggered based on a geo-fence zone, such as one established for an area affected by a natural disaster or a crime scene or an industrial fire, etc. Such notifications may be triggered pursuant to requests from government entities which may communicate with the consumer data aggregation platform 100 via the emergency push interface (see e.g., FIG. 1A at element 119) which is an API and service exposed to and provided to authenticated and verified government entities.

Further depicted here are notifications based on a particular consumer's retail membership card(s) 204 including triggering advertisements or discounts based on the consumer entering a geo-fence zone or the installed mobile app may pull advertisements pursuant to configuration of the app and consumer specified preferences, or recall notices may be triggered based on the consumer's retail membership card(s) 204, or automated orders may be triggered, etc. According to certain embodiments, information from retail membership cards 204 may be aggregated into a single card member database 201.

Additionally depicted are music, sports, and news content distribution 205 (e.g., via the Synchronicity platform) which may be customized and tailored on the basis of a consumer entering a geo-fence zone, incorporated into pull ads, product recalls, and auto orders, based on preferences within the installed app, and so forth.

The consumer data aggregation platform may collect and send various data to mobile devices, vehicle onboard systems, and other interfaces between users and the consumer data aggregation platform 100. Data may include consumer data as previously discussed, including contact information, purchase history, and membership information and preferences. Telemetry data may also be collected, such as health-related data from a patient health monitoring device 1103, or vehicle-related data such as airbag deployment, collision information, etc. Given the sensitivity of such data, according to certain embodiments, the data may be secured or removed from third party access, similar to locking a vehicle's glove box or trunk before handing the vehicle over to a valet. For example, data may be encrypted or offloaded to the consumer data aggregation platform 100 and then wiped from a vehicle onboard system, in the context of, for example, handing a vehicle over to a repair shop, renting a vehicle, when a vehicle is impounded, or when the principal user of a vehicle changes mobile devices. The principal user may download their data at a later point in time, for example upon repossession of their vehicle, through a mobile device or vehicle onboard system communicably interfaced with the consumer data aggregation platform 100. According to certain embodiments, the offloading and/or wiping of data from a vehicle onboard system or mobile device may be periodically scheduled or manually requested.

FIG. 3A illustrates additional detail regarding data set sources and activation criteria for the consumer data aggregation platform, in accordance with described embodiments.

As shown here, various notifications may trigger on the basis of a consumer's participation with a membership rewards program or based on purchase history (membership cards/purchases 301), etc. The activation criteria for a notification, recall, consumer alert, advertisement, etc. may be triggered based on whether a product warranty is in effect or has been registered, based on a known recall 302. Notifications may also be based on the merger of that data with the consumer's participation and purchase history 303 and pulled from grocery stores and clothing stores, or pulled in association with medical devices, purchase of medications from a pharmacy, in association with airlines and hotels, purchases of cars, appliances, in association with gas/fuel card membership programs, based on affiliation or affinity for various sports teams or casino membership programs, policy details from insurance providers, notifications pursuant to national emergency notifications and events, etc.

According to certain embodiments, the notifications may be pulled based on retailers and service providers within a certain geographic distance of a user device, such as 1-20 miles. For example, the activation of a notification event to the consumer may be based on, for example, a variety of configurable criteria, such as the entry into a geo-fence within 1 mile of a grocery store, entry into a geo-fence within 20 miles of a clothing or department store, entry into a geo-fence associated with a medical device supplier (e.g., to purchase new insulin equipment by way of example), entry into a geo-fence zone within 1-mile of a pharmacy, entry into a geo-fence zone within 20 miles of a preferred gas station based on the consumer's participation in a gas/fuel rewards program, etc. Moreover, non-geographic criteria may also be utilized, such as a trigger to book hotel, airlines, or rental car reservations based on consumer preferences or activity.

Auto-order and auto-fill triggers, reminders, or reservations 304 may further be configured to trigger a notification or event on the basis of, for example, auto-order by date, trigger a reminder, auto-orders based on a geo-fence zone, notifications based on a reservation, or a variety of other reminders. For example, the consumer data aggregation platform 110 may use manufacturer, retailer, and agency/network registries to advertise and remind a consumer purchasing prescription medication that their supply of pills is running low and that they need a refill. According to certain embodiments, this recommendation may be based on the consumer's purchase history, product inventory, or estimated usage of the product gathered from manufacturer, retailer and agency/network sources.

Figure 3B:
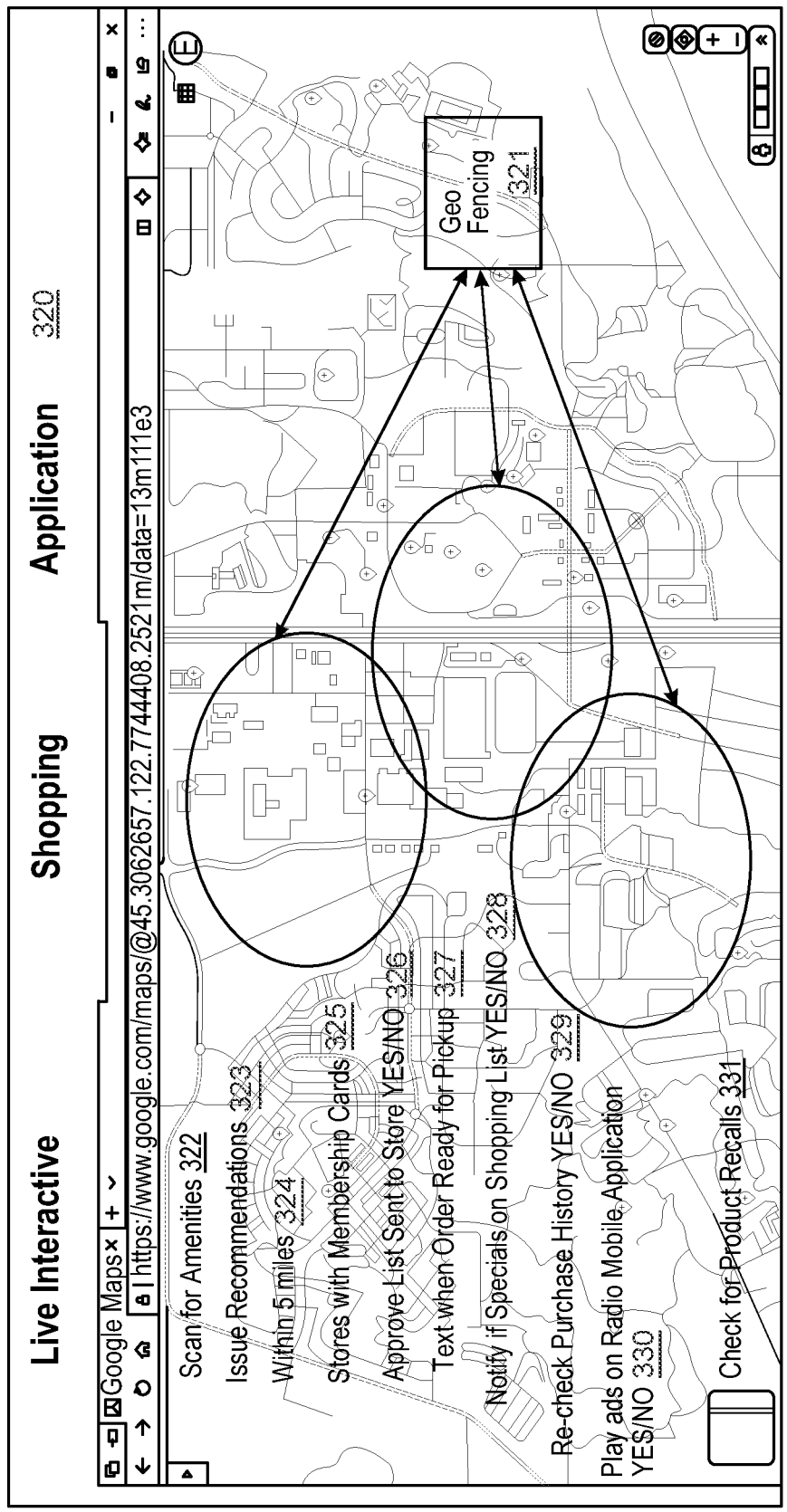
FIG. 3B illustrates exemplary geo-fence zones which may be utilized by the consumer data aggregation platform to trigger various notifications, in accordance with described embodiments.

FIG. 3B illustrates exemplary geo-fence zones which may be utilized by the consumer data aggregation platform to trigger various notifications, in accordance with described embodiments.

As shown here, there are a variety of geo-fence zones 321 which may be considered or utilized by the consumer data aggregation 115 platform 100 via a live interactive shopping application 320. For example, a geo-fence zone ("geo-fencing") 321 may be associated with a type of location such as a high school which may trigger based on an emergency notification or a geo-fence zone associated with a grocery store which may trigger on the basis of a consumer's participation in a rewards membership program, etc. As depicted here, there are geo-fence zones 321 established. The consumer data aggregations platform 100, for example via Rescue Datum AI software, may scan for amenities 322 within geo-fence zone 321 for pull advertising purposes by identifying ads, events, and amenity locations such as stores, hospitals, gas stations, and electric charging stations.

According to certain embodiments, this may be done through scanning physical markers such as billboards using optical recognition devices (ORDs) such as smart glasses. According to yet other embodiments, scanning for amenities 322 may involve reviewing digital information such as databases, websites (including consumer review websites such as Yelp), etc. Scanning for amenities 322 may involve cell phones, vehicle onboard systems, computers, satellites, etc. According to yet other embodiments, scan for amenities 322 may be independent of a geo-fencing 321 and may involve, for example, a consumer watching a sports game with an optical recognition device and the consumer data aggregation platform 100 recognizing product placement within the sports game such as shoes that athletes are wearing. The optical recognition device may then issue recommendations 323 to the consumer regarding the product placement such as asking whether the consumer would like to purchase the product.

Pursuant to scan for amenities 322, the consumer data aggregation platform 100 may issue recommendations 323. Issue recommendations 323 may be triggered on the basis of items on a weekly shopping list, based on the consumer being within 5 miles 324 of the geo-fence zone, or based on the consumer's participation in a membership program for a grocery store, for example by having membership cards 325. According to other embodiments, issue recommendations 323 may be triggered based on comparing amenities, ads, and promotions to user checklists, priorities, or other settings. Issue recommendations 323 may be push notifications to the consumer asking if the consumer would like to purchase recommended products or services or find out more about amenities including activating promotions or getting directions to an amenity location. Issue recommendations 323 may be voice prompts or text notifications sent via a vehicle onboard system. Upon the consumer approving an issue recommendation 323, for example, to order a product, an auto-order event may trigger to purchase and pick up groceries from the grocery store based on the consumer's shopping list or an approve list 326.

Pursuant to sending approve list 326, the consumer data aggregation platform 100 may reach out to various sellers to check the availability of the requested product or service, as well as to check and compare pricing across sellers. According to certain embodiments, the consumer may choose which seller among many sellers with whom they wish to place an order. When an order is placed, it may be followed by a text 327 to confirm when the order is ready for pickup. Similarly, the consumer may be notified of discounts, specials, or sales 327 for an item or related product based on preferences or based on items on a shopping list. Furthermore, the live interactive shopping application 320 may reference historical buying habits for a consumer to see if any items from the weekly shopping list have been missed 329.

Advertisement notifications may be issued via SMS text, prompts to a mobile app installed by the consumer, or played via a radio mobile application 330 communicably interfaced with the Synchronicity platform. According to certain embodiments, consumers may be reminded of recall notices by the consumer data aggregation platform 100 checking for product recalls 331. According to certain embodiments, consumers outside of geo-fence zones 321 may also be asked if they would like to place orders for purchases and pick them up when they are within or near geo-fence zones 321. According to still other embodiments, consumers receive notifications of product recalls or advertising when they enter a store where they purchased a recalled product or a store where they have a shopping history. Such direct consumer notification of product recalls avoids the difficulty of manufacturers and retailers relying on in-store signs or consumer mailings to notify consumers of product recalls and advertising promotions.

Figure 3C:
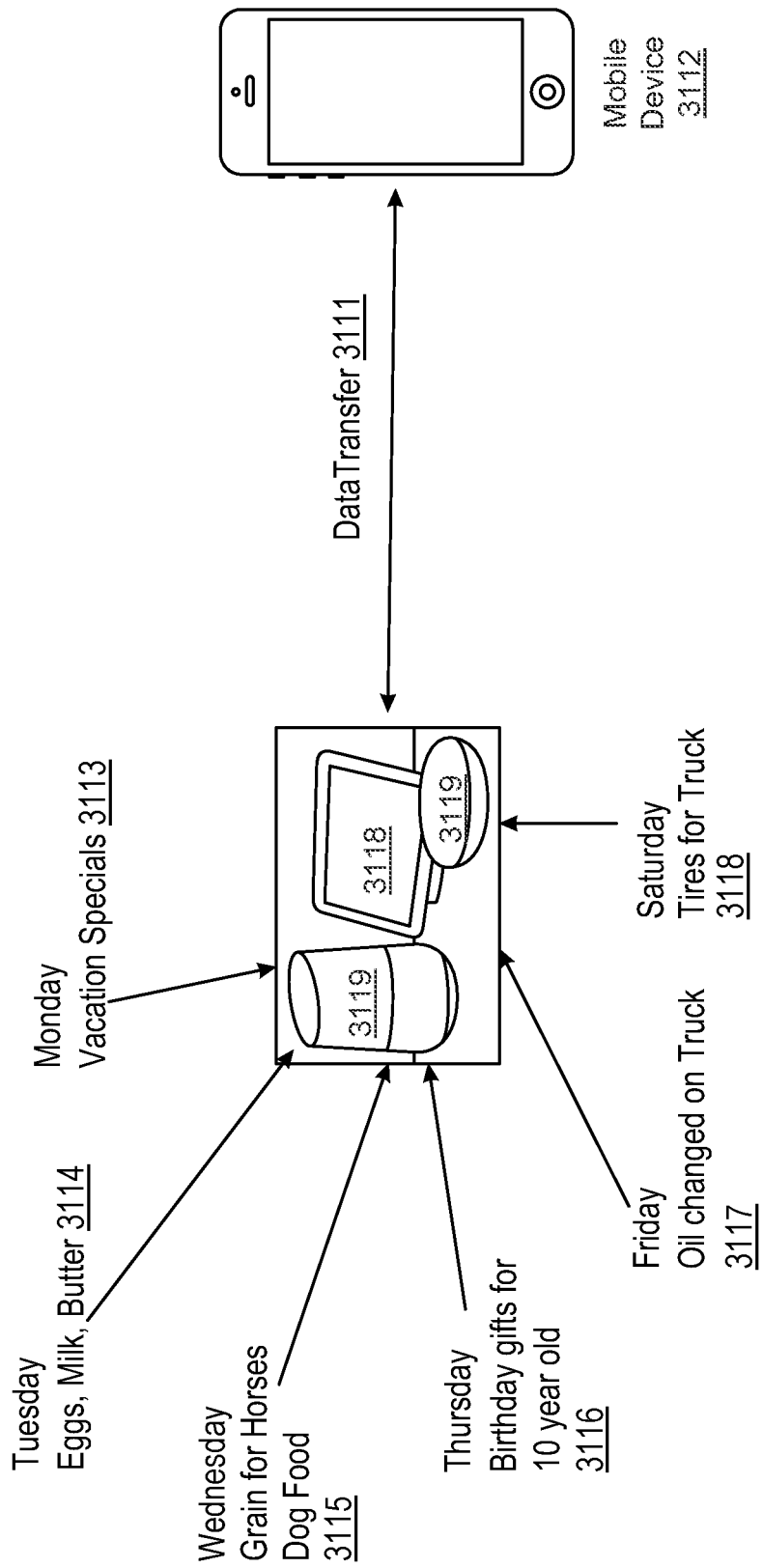
FIG. 3C illustrates additional detail for an automated order and consumer notification issued from the consumer data aggregation platform, in accordance with described embodiments.

FIG. 3C illustrates additional detail for an automated order and consumer notification issued from the consumer data aggregation platform, in accordance with described embodiments.

For instance, as is depicted here, based on a verbal shopping list 3110, the consumer data aggregation platform may issue a data transfer 3111 to trigger a push notification to the consumer's mobile device 3112 notifying the consumer of, for example, vacation specials 3113 based on their travel preferences, or the need to purchase eggs, milk, and butter 3114 from A grocery store within a specific geo-fence zone based on a shopping list created by the consumer and based on the consumer's membership in a rewards program for a particular grocery store. The consumer data aggregation platform 100 may issue a reminder to the consumer to purchase grain for the consumer's horses or dog food for their pets 3115. Similarly, the consumer data aggregation platform may issue a notification to purchase birthday gifts for the consumer's 10-year-old niece 3116 or to have their oil changed on Friday 3117 or to review tires at an auto parts store which go on sale on Saturday 3118, etc. According to certain embodiments, the consumer data aggregation platform may interface and receive shopping list or other consumer and advertising information from mobile devices that consumers use such as tablets 3118 and household virtual assistant AI technology 3119 such as Amazon Alexa.

Figure 4:
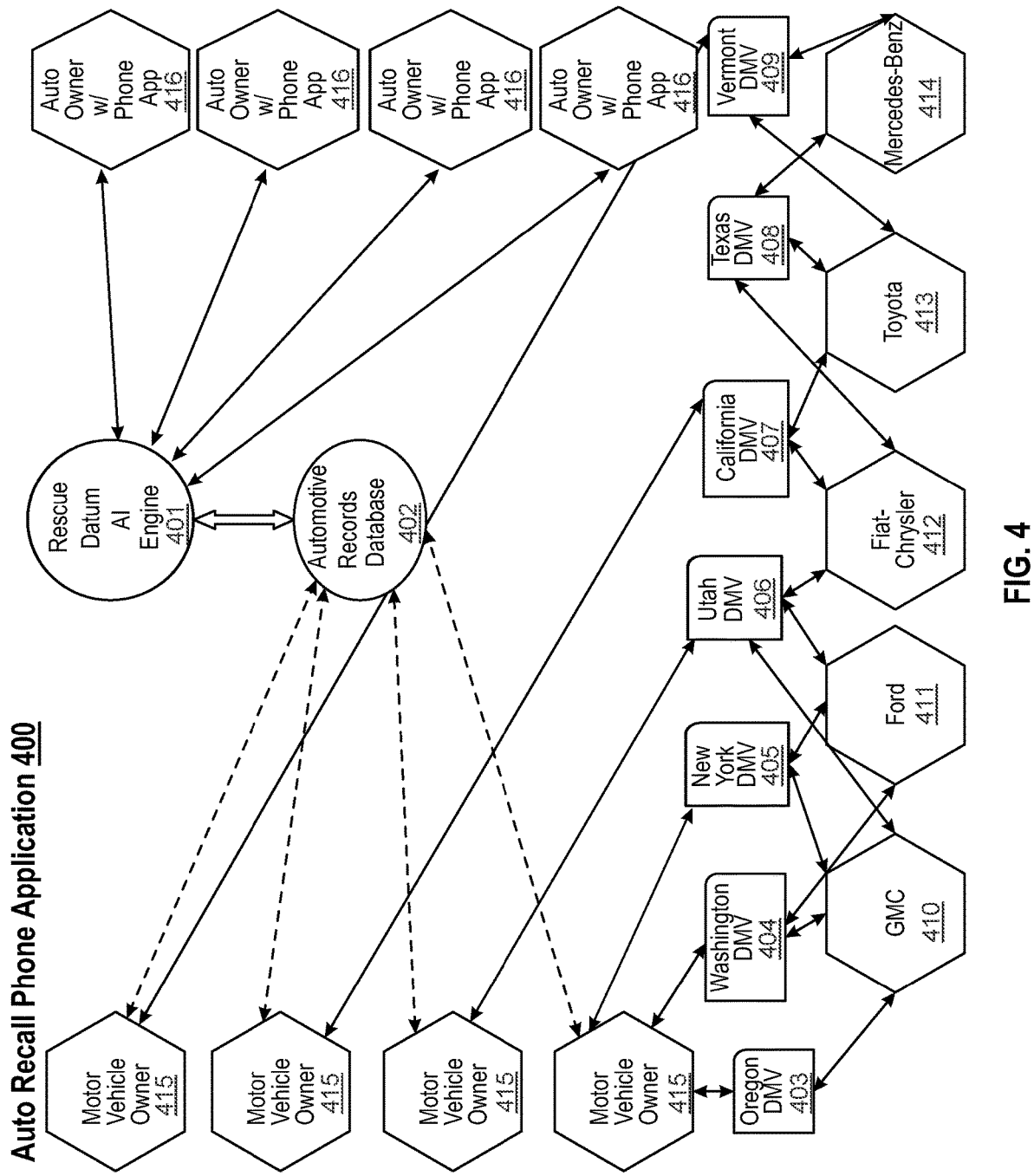
FIG. 4 illustrates additional detail regarding triggering of auto-recall phone notifications issued from the consumer data aggregator platform, in accordance with described embodiments.

FIG. 4 illustrates additional detail regarding triggering of auto-recall phone notifications issued from the consumer data aggregation platform, in accordance with described embodiments.

According to certain embodiments, the consumer data aggregation platform 100 implements an auto-recall notification function utilizing a rescue datum AI engine 401 executing within the consumer data aggregation platform 100. As described above, the consumer data aggregation platform 100 receives various data sub-sets and issue notifications. Such notifications may be pushed to, for example, an auto owner with the rescue datum phone app 400. Such notifications may be issued pursuant to data collected and aggregated by an automotive records database 402 such as the RL Polk database operating in conjunction with the consumer data aggregation platform 100 which receives and aggregates, for example, motor vehicle owner records from various databases including the Oregon 403, Washington 404, New York 405, Utah 406, California 407, Texas 408 and Vermont 409 DMVs, each of whom receive data from vehicle manufacturers such as GMC 410, Ford 411, Fiat-Chrysler 412, Toyota 413, and Mercedes 414, as is depicted here. Thus, even where the consumer data aggregation platform 100 lacks direct connectivity with a data source, the consumer data aggregation platform 100 may nevertheless receive and aggregate incoming data sets indirectly, such as aggregating the vehicle owner 415 information from the various DMVs via automobile manufacturer records which are provided by the manufacturers to the DMVs. In such a way, the consumer data aggregation platform 100 can then notify affected consumers of a vehicle recall or other event, that is automobile owners with an associated phone app 416 such as the Rescue Datum phone app.

Figure 5:
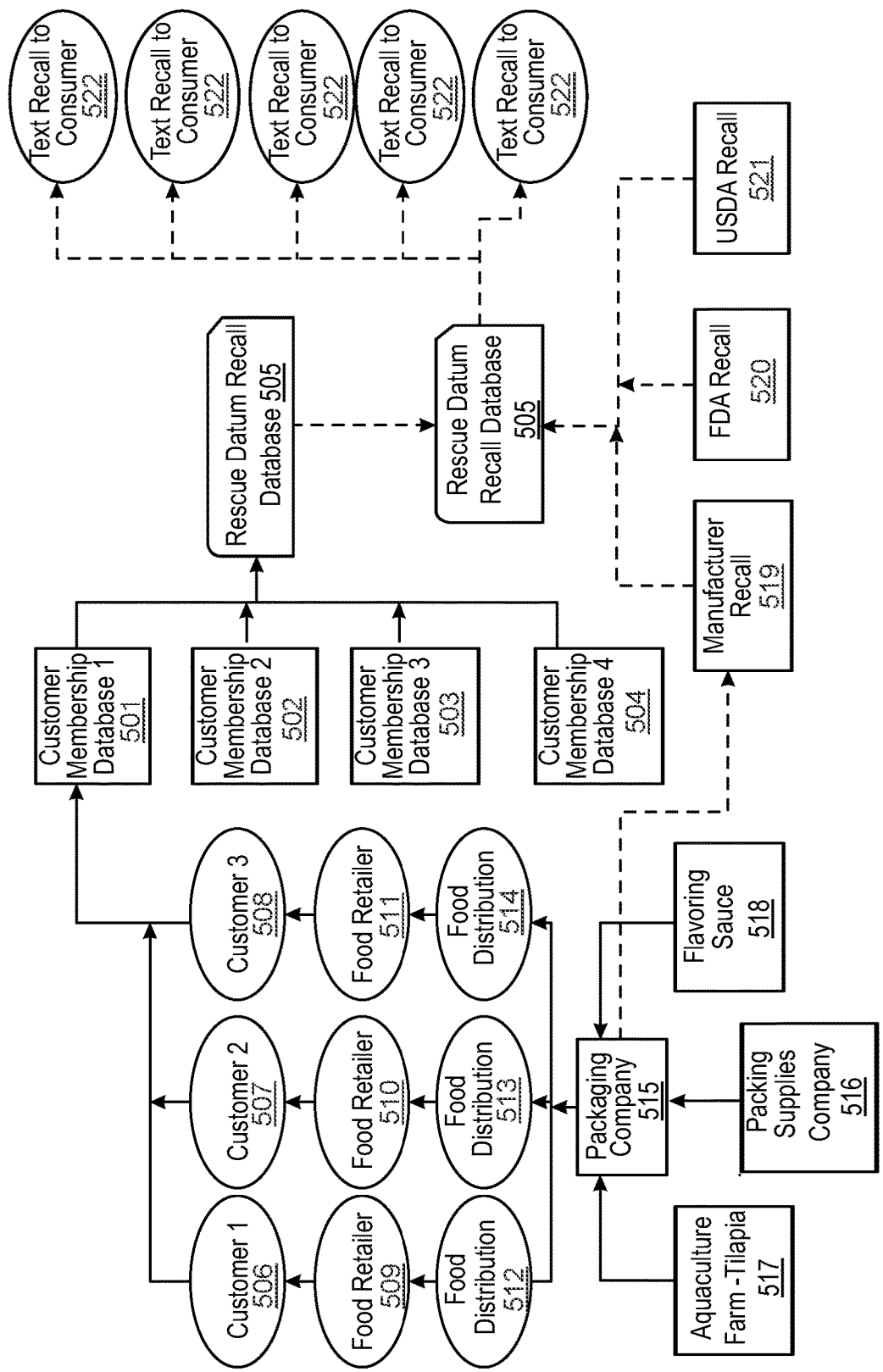
FIG. 5 illustrates additional detail regarding triggering of food recall notifications issued from the consumer data aggregator platform, in accordance with described embodiments.

FIG. 5 illustrates additional detail regarding triggering of food recall notifications issued from the consumer data aggregation platform, in accordance with described embodiments.

For instance, as shown here, food recall phone application 500 includes multiple customer membership databases 501-504 containing data sets, each communicatively interfaced with the consumer data aggregation platform 100 via the rescue datum recall database engine 505. Each of the customer membership databases 501-504 are, in turn, interfaced with various customers 506-508, food retailers 509-511, and food distributors 512-514, which are in turn interfaced with other service providers such as packaging companies 515, packing supply companies 516, aquaculture and fish farms 517, product providers (e.g., such as a manufacturer of flavoring sauces 518), etc.

These entities result in a rich data set which is transmitted to and stored by the consumer data aggregation platform 100 in the event it is necessary to trigger and issue a recall notification to affected customers.

The consumer data aggregation platform 100 receives notifications or requests from, for example, manufacturers to issue a recall 519, or the FDA to issue a recall 520, or the USDA to issue a recall 521, or even packaging companies 515 or suppliers to issue a recall. Responsive to these requests the consumer data aggregation platform 100 executes a rescue data recall AI trained model and algorithm when notified that a food recall needs to be issued. The AI trained model then analyzes applicable data sets stored and collected by the consumer data aggregation platform 100 to determine what consumers are affected and how to notify them, for example, by issuing texts recall notices or app alerts to the affected consumers 522.

Figure 6:
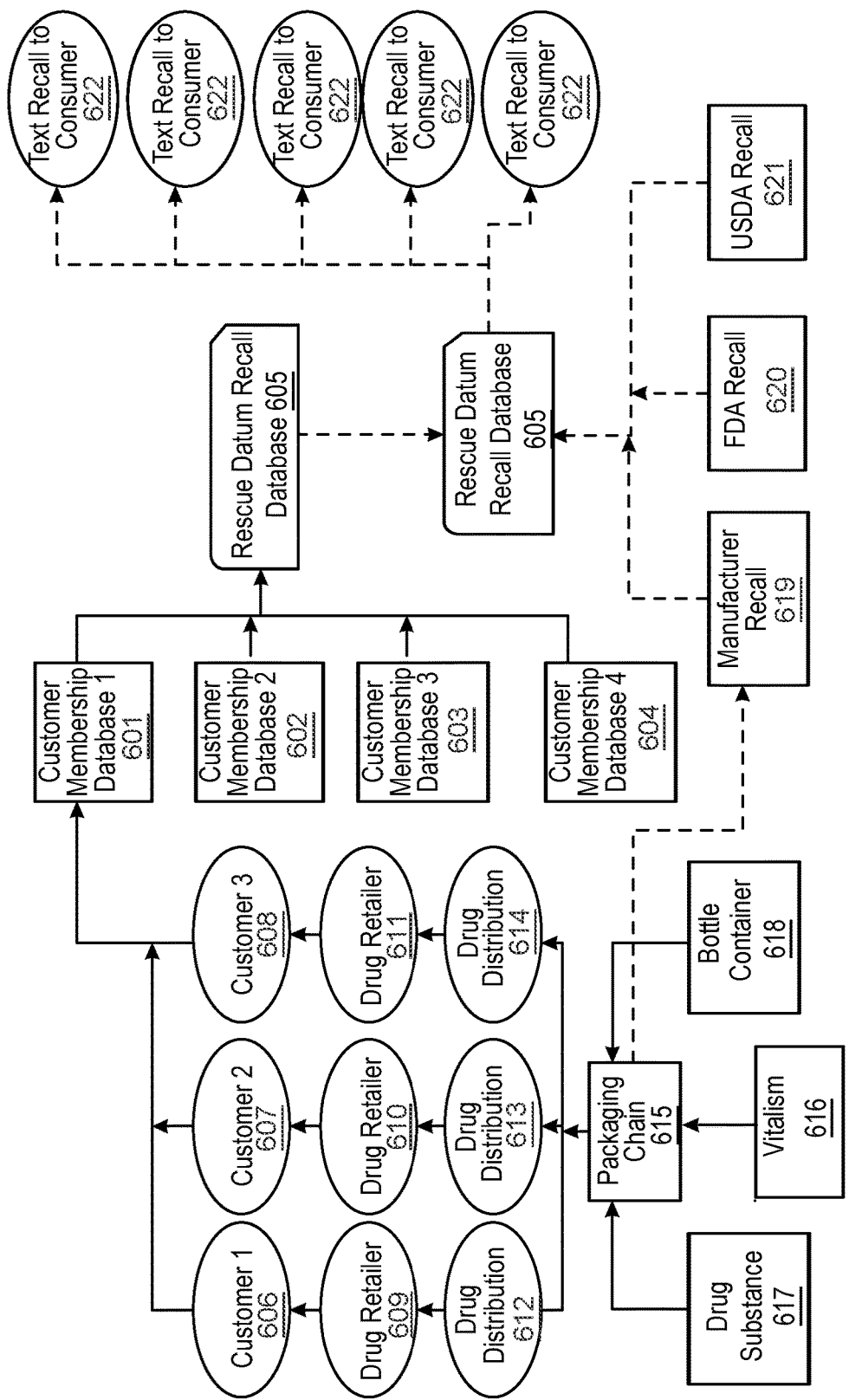
FIG. 6 illustrates another exemplary data flow model for triggering a drug recall notification issued from the consumer data aggregator platform to affected consumers, in accordance with described embodiments.

FIG. 6 illustrates another exemplary data flow model for triggering a drug recall notification issued from the consumer data aggregation platform to affected consumers, in accordance with described embodiments.

Similar to the prior example for a food recall, the drug recall involves the consumer data aggregation platform 100 receiving notifications or requests from, for example, manufacturers and distributors participating in the drug packaging chain 615. For example, a manufacturer may request and trigger a recall 619, as may the FDA 620 or other government entity 621 due to a discovered issue with a drug substance 617, vitalism 616, with a packaging supplier such as the bottle containers for a drug 618, and so forth. The consumer data aggregation platform 100 executes the rescue datum recall AI trained algorithm and model to consume or train based on the data stored in the rescue datum recall databases 605 of the consumer data aggregation platform 100 and then responsively issues the SMS texts 622 or app alerts to affected consumers.

Figure 7A:
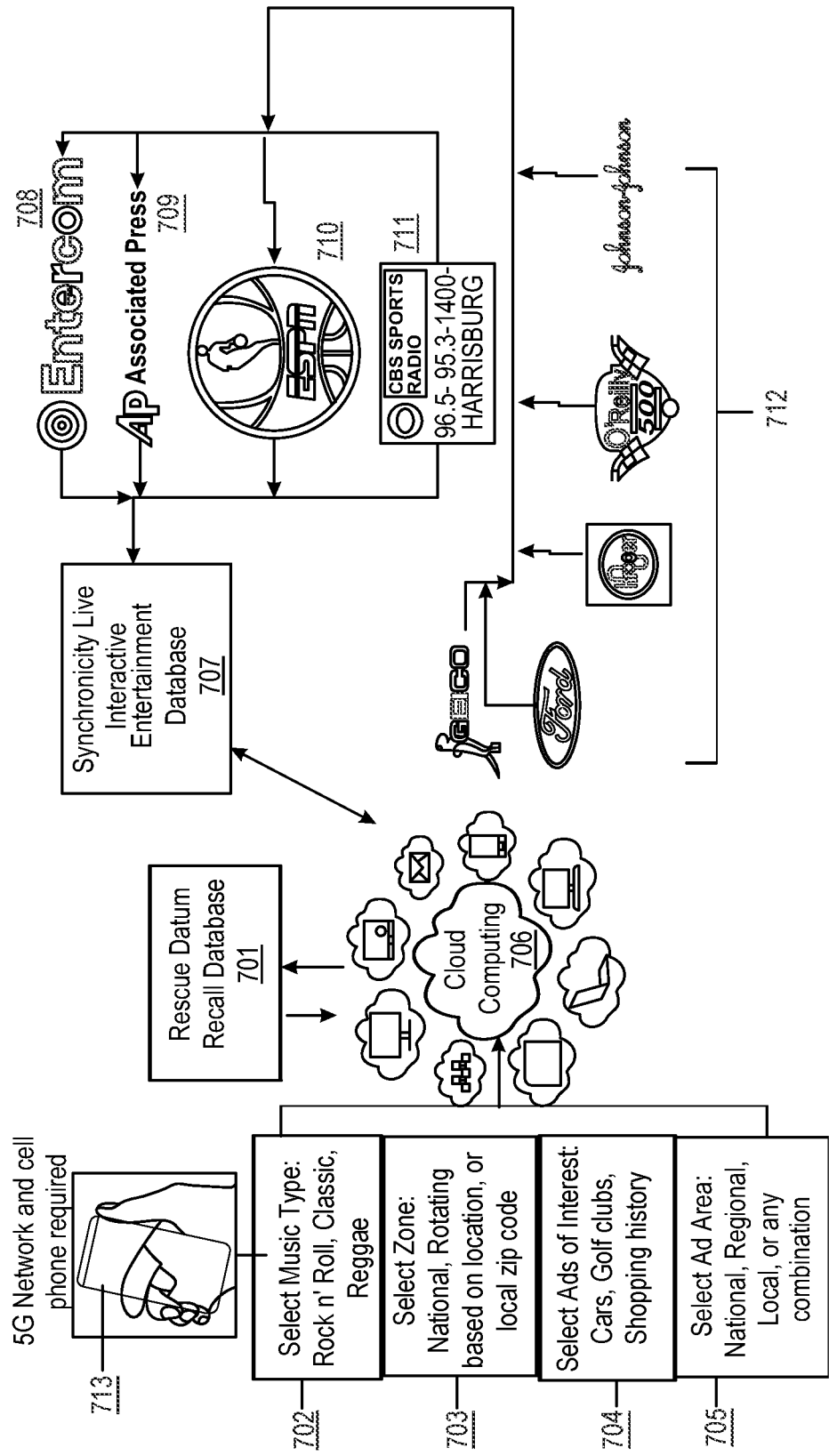
FIG. 7A illustrates exemplary details for a drive-by/pull advertising model to issue notifications from the consumer data aggregator platform, in accordance with described embodiments.

FIG. 7A illustrates exemplary details for a drive-by/pull advertising model 700 to issue notifications from the consumer data aggregation platform 100, in accordance with described embodiments.

As shown here, the consumer data aggregation platform 100 executes rescue datum recall database(s) 701 which permit user mobile devices 713, such as mobile phones, tablets, etc., to select the type of music users wish to listen to 702 (e.g., rock n' roll, classical, etc.) as well as to have their geographic zone automatically selected 703 (or manually selected if desired), to further select the particular type of ads of user interest 704 or alternatively, to have ads targeted based on specified user interests, such as interest in cars, golf clubs, etc., or to have ads targeted based on user metadata or account usage history, such as user shopping history, items added to "wish lists" on shopping websites, items added to user personal shopping list on a Google Home or Amazon Alexa device, etc. The user may further select an ad geographic area 705, by indicating a preference for national ads, regional ads, local ads, or any combination.

Further depicted is the receipt of the user's preferences and selections 702-705 as advertising metadata preferences which are received and processed by the cloud computing architecture 706 provided by the consumer data aggregation platform 100.

According to certain embodiments, the consumer data aggregation platform 100 operates in conjunction with the Synchronicity live interactive entertainment database platform 707 which receives advertising content and then pushes advertising campaigns 712 to users based on user-indicated advertising preferences.

For instance, the Synchronicity live interactive entertainment database platform 707 may receive advertising content from advertisers such as Entercom 708, news fees and advertising from the Associated Press 709, sports updates, game stats, and sports-related advertising from ESPN 710, sports content and advertising from various sports radio stations and broadcasters, such as CBS Sports Radio 711, etc. In related embodiments, advertisers may push advertising content through an intermediary, such as Entercom 708, the AP 709, ESPN 710, and CBS Sports Radio 711, which is then forwarded onto the Synchronicity live interactive entertainment database platform 707 to be pushed to user mobile devices 713 based on user-indicated preferences. Rescue datum recall database 701 utilizes consumer data aggregation platform 100 to push marketing campaigns 712 to user mobile devices 713 based on user consent and preferences.

Figure 7B:
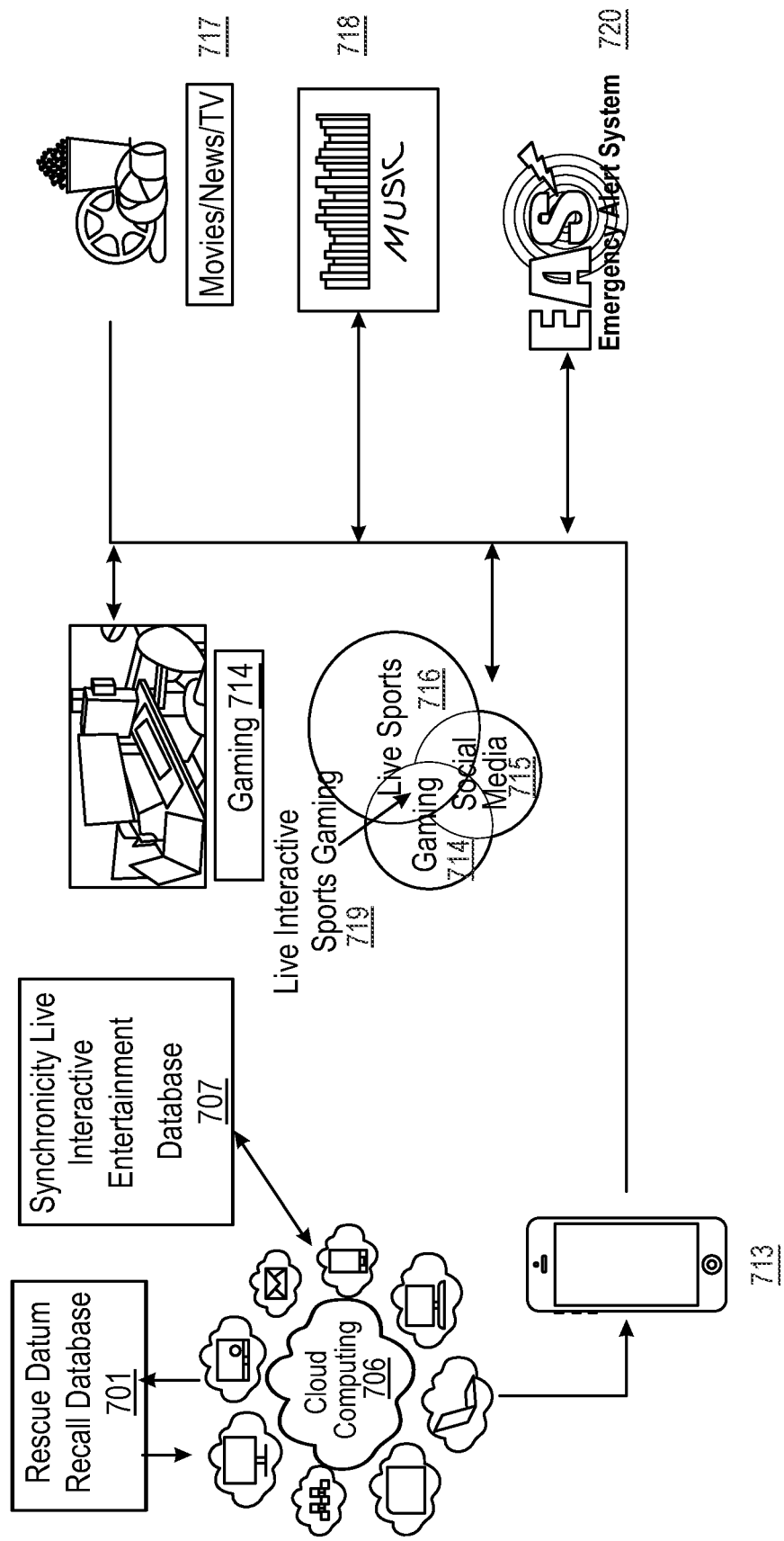
FIG. 7B illustrates additional details for a drive-by/pull advertising model to issue notifications from the consumer data aggregator platform, in accordance with described embodiments.

FIG. 7B illustrates additional details for a drive-by/pull advertising model to issue notifications from the consumer data aggregation platform, in accordance with described embodiments.

Similar to the example above, rather than pushing sports-related content 716 and advertising, the system may push gaming related content 714, social media related content 715, movie, news, and TV related content 717, music-related content 718, or live interactive gaming and sports-related content 719 to the user mobile devices 713 through consumer data aggregation platform 100.

Similarly, certain government entities and other specified organizations may be granted access to an API of the consumer data aggregation platform 100, permitting those organizations to issue consumer alerts and other notifications through the Emergency Alert System 720.

Figure 7C:
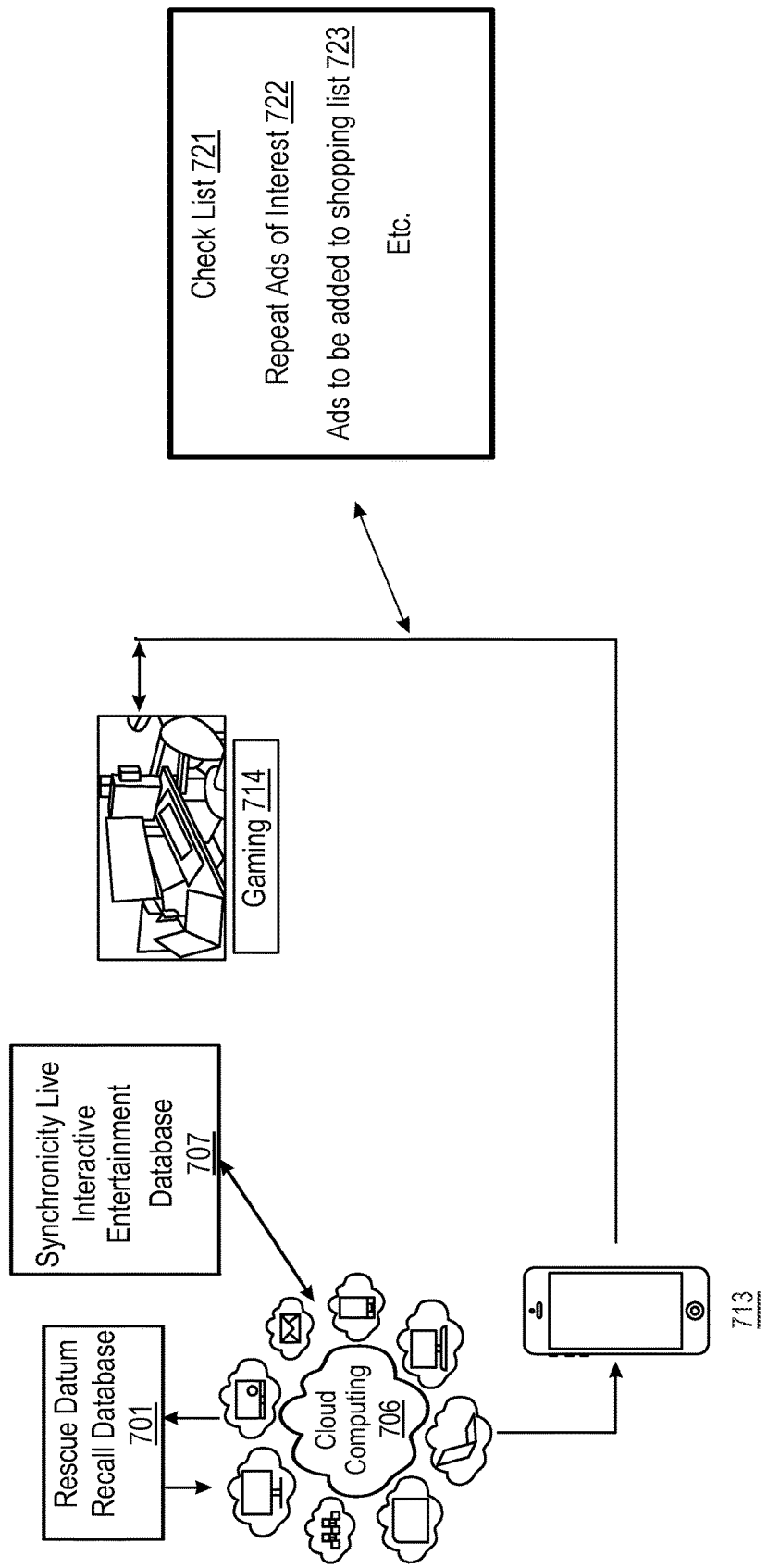
FIG. 7C illustrates exemplary details for a drive-by/pull advertising model to issue notifications from the consumer data aggregation platform, in accordance with described embodiments.

FIG. 7C illustrates exemplary details for a drive-by/pull advertising model to issue notifications from the consumer data aggregation platform 100, in accordance with described embodiments.

Further to the above examples, the consumer data aggregation platform 100 may additionally provide access to data stored by customer home devices 3119 such as Google Home and Amazon Alexa, including providing reminders, advertising, and alerts based on checklists 721 stored by those devices, shopping lists based on information stored by those devices, and the generation of advertising content tailored for the user based on the preferences and consent associated with such devices. Such generated advertising content may include repeating ads of interest 722 (for example based on user preferences and consent), ads to be added to a shopping list 723 (for example shopping lists stored by customer home devices 3119), gaming 714, etc. which may be sent to user mobile device 713.

Figure 8A:
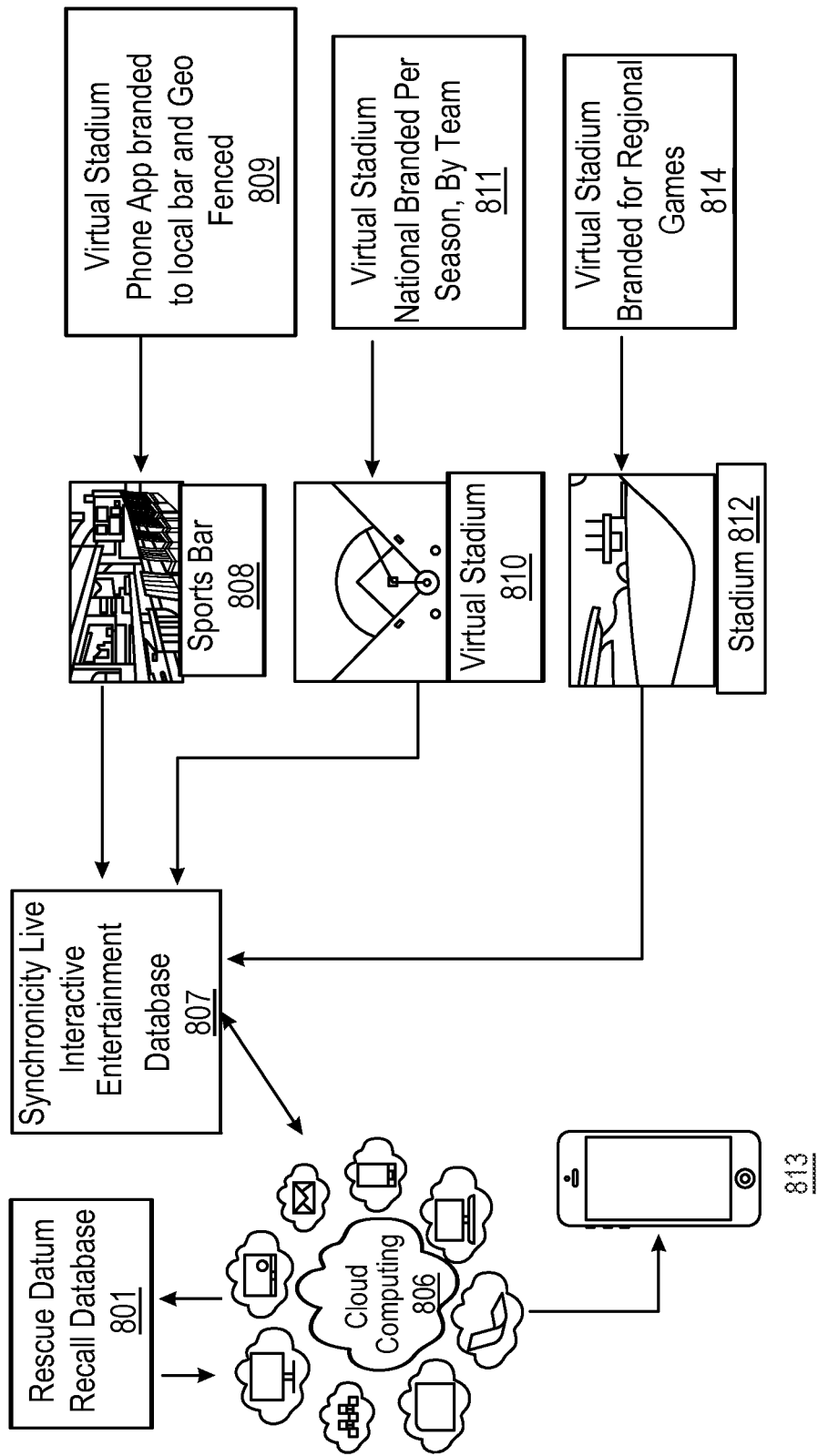
FIG. 8A illustrates exemplary details for a live interactive entertainment advertising model to issue notifications from the consumer data aggregator platform, in accordance with described embodiments.

FIG. 8A illustrates exemplary details for a live interactive entertainment advertising model 800 to issue notifications from the consumer data aggregation platform, in accordance with described embodiments.

Depicted here is the utilization of the consumer data aggregation platform 100 operating in conjunction with the Synchronicity live interactive entertainment database platform 807 to push targeted sports-based ads to the user's mobile device 813 through the cloud platform provided by the consumer data aggregation platform and its Rescue Datum recall databases 801.

For example, through the consumer data aggregation platform, it is further possible to push a virtual stadium phone app to the user which is custom branded for a specific local bar 808 based on the user's geographic area in relation to a particular geo-fence zone 809. Similarly, it is possible to push a virtual stadium 810 phone app to the user which is custom branded for a national sports team or branded for a particular season 811, based on the user's proximity to the relevant geo-fence zone. Similarly, a custom branded virtual stadium branded for regional sporting games 814 may be pushed to the user's mobile device when at a real stadium 812 through consumer data aggregation platform 100.

Figure 8B:
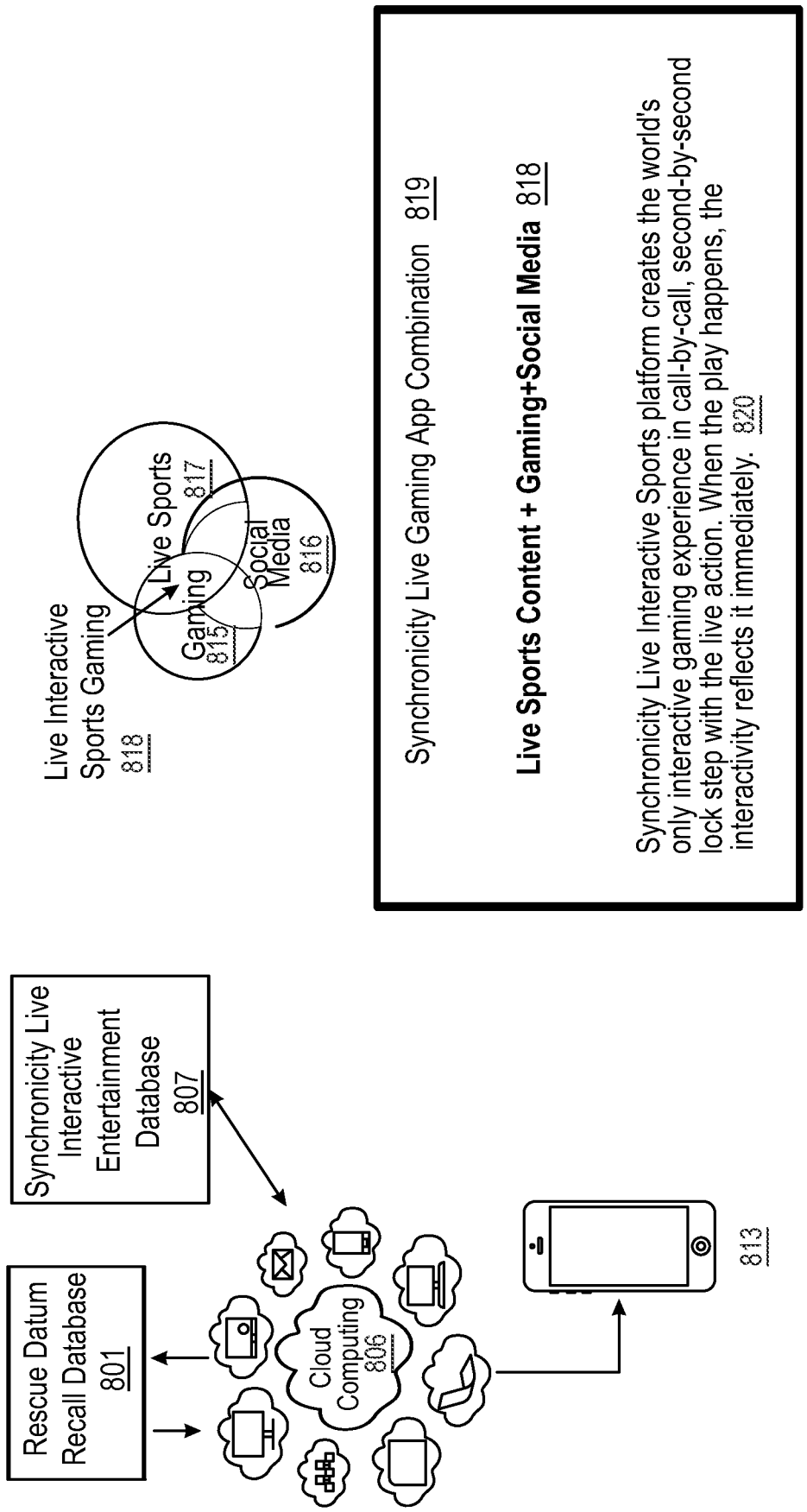
FIG. 8B illustrates exemplary details for a live interactive entertainment advertising model to issue notifications from the consumer data aggregation platform, in accordance with described embodiments.

FIG. 8B illustrates exemplary details for a live interactive entertainment advertising model to issue notifications from the consumer data aggregation platform 100, in accordance with described embodiments.

Similar to the above example, the consumer data aggregation platform 100 operating in conjunction with the Synchronicity live interactive entertainment database platform 807 may additionally push gaming-related advertising 815, social media related advertising 816, and live and interactive sports-related advertising 817 to the user's mobile device 813 through the consumer data aggregation platform 100. The Synchronicity live interactive entertainment database platform 807 combines multiple high-growth mobile device activities into a single application 819, providing the user with seamless and intuitive access to live sports content and gaming content and social media content 818, all within a single mobile app ecosystem.

The Synchronicity live interactive entertainment database platform creates the world's only interactive gaming experience providing call-by-call and second-by-second lock-step user experience with the live gaming action 820. Stated differently, the Synchronicity live interactive entertainment database platform permits the user to see the interactive gaming experience on the user's mobile device immediately update and reflect the live-in-game experience in near-real-time, regardless of whether the user is at the stadium watching the game live, watching the game live on cable or broadcast TV, listening on the radio, or monitoring the status of the game over the Internet.

FIG. 9 illustrates a diagrammatic representation of a machine 900 in the exemplary form of a computer system, in accordance with one embodiment.

According to such an embodiment, machine 900 implements a set of instructions, for causing the machine 900 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 918, which communicate with each other via a bus 930. Main memory 904 includes information and instructions and software program components necessary for performing and executing the functions with respect to the various embodiments of the systems, methods for implementing a direct-to-air management and audit platform for dynamic advertising content as described herein. Stored instructions when executed by a processor implement the above described functionality of the consumer data aggregation platform including the dataset manager 923. The collected data sets may be utilized as data sets 924 for AI model training by the AI model 922 in addition to being utilized to identify how and when to contact consumers affected by a product recall, sending relevant users an emergency event alert, executing operations to assist users during emergencies, or even sending consumers notifications pursuant to an advertising campaign. The datasets 924, AI model 922, and instructions for executing the data set manager 923 may be stored within main memory 904. Main memory 904 and its sub-elements are operable in conjunction with processing logic 926 and/or software 922 and processor 902 to perform the methodologies discussed herein.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application-specific integrated circuit (ASIC), a field-programmable gate array (FPGA), a digital signal processor (DSP), network processor, or the like. Processor 902 is configured to execute the processing logic 926 for performing the operations and functionality which are discussed herein.

The computer system 900 may further include one or more network interface cards 908 to interface with the computer system 900 with one or more networks 920. The computer system 900 also may include a user interface 910 (such as a video display unit, a liquid crystal display (LCD), or a cathode ray tube (CRT)), an alphanumeric input device 912 (e.g., a keyboard), a cursor control device 914 (e.g., a mouse), and a signal generation device 916 (e.g., an integrated speaker). The computer system 900 may further include peripheral device 936 (e.g., wireless or wired communication devices, memory devices, storage devices, audio processing devices, video processing devices, etc.). The computer system 900 may perform the functions of determining and instructing a traffic signal to carry out the green lights activity and phase timings as determined by such a system 1000 as described herein.

The secondary memory 918 may include a non-transitory machine readable storage medium (or more specifically a non-transitory machine-accessible storage medium) 931 on which is stored one or more sets of instructions (e.g., software 922) embodying any one or more of the methodologies or functions described herein. Software 922 may also reside, or alternatively reside within main memory 904, and may further reside completely or at least partially within the processor 902 during execution thereof by the computer system 900, the main memory 904 and the processor 902 also constituting machine-readable storage media. The software 922 may further be transmitted or received over a network 920 via the network interface card 908.

Figure 10A:
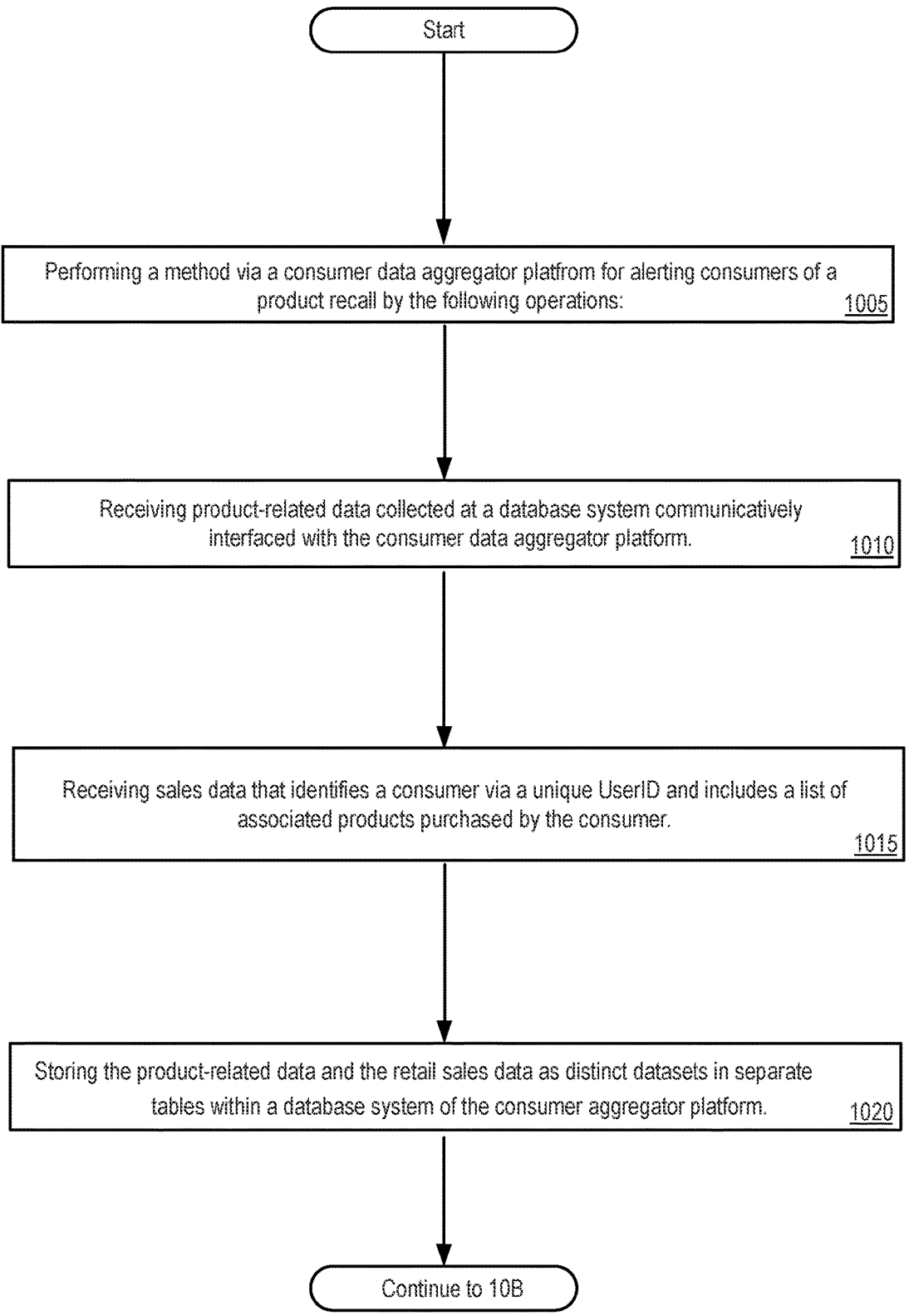
FIGS. 10A and 10B depict flow diagrams illustrating a method for implementing a consumer data aggregation platform, in accordance with described embodiments.
Figure 10B:
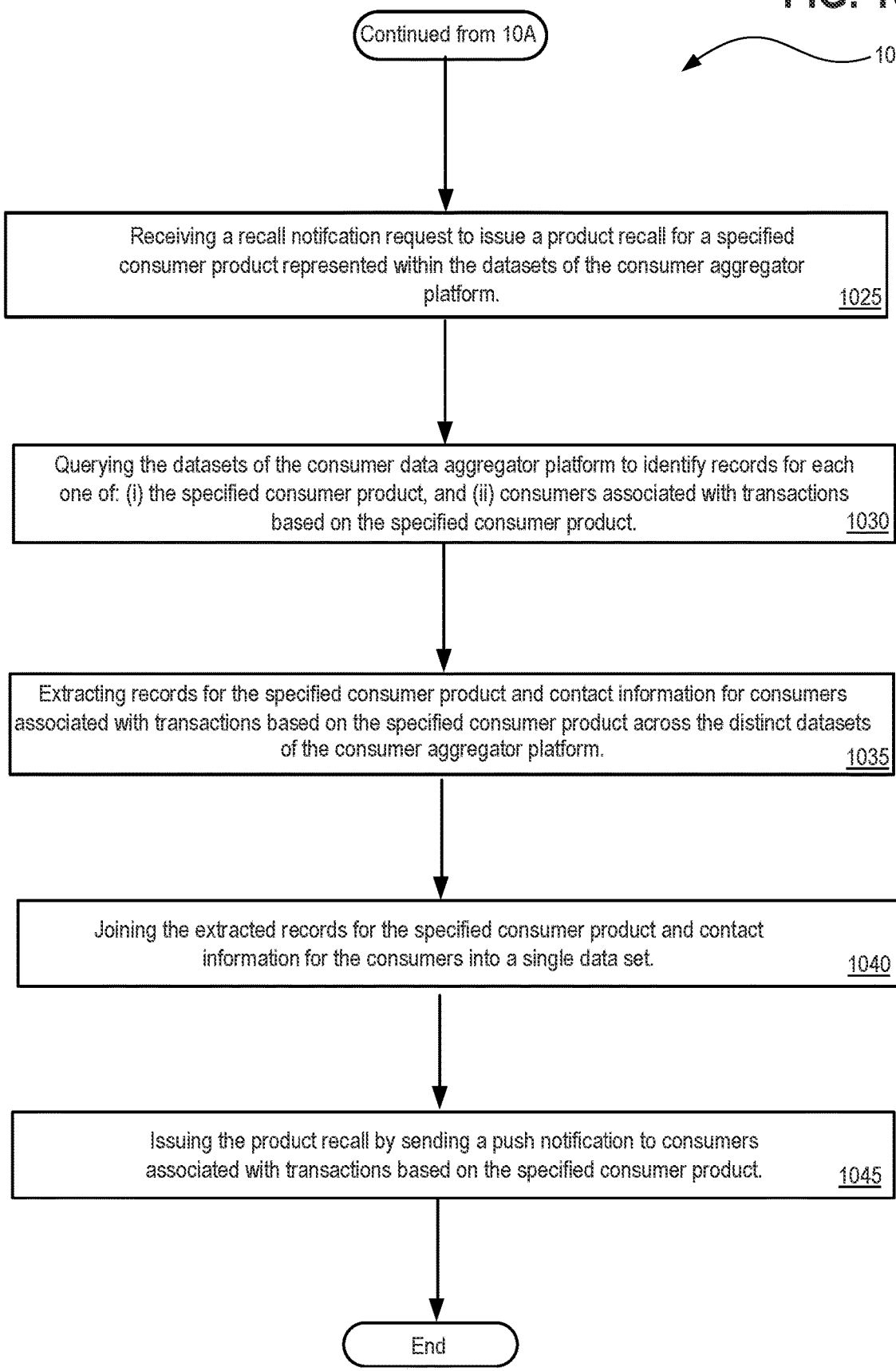

FIGS. 10A and 10B depict flow diagrams illustrating a method for implementing a consumer data aggregation platform for seamless product recall and consumer alert management in accordance with described embodiments.

Method 1000 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating instructions, or some combination thereof). In one embodiment, method 1000 is performed or coordinated via system architecture such as that depicted at FIG. 1B, such as the consumer data aggregation platform 110. Some of the blocks and/or operations listed below are optional in accordance with certain embodiments. The numbering of the blocks presented is for the sake of clarity and is not intended to prescribe an order of operations in which the various blocks must occur. Additionally, operations from method flow 1000 may be utilized in a variety of combinations.

Method 1000 begins at block 1005 with a method performed by a consumer data aggregation platform having at least a processor and a memory therein for alerting consumers of a product recall, via the following operations:

At block 1010, processing logic receives product-related data collected at a database system communicatively interfaced with the consumer data aggregation platform.

At block 1015, processing logic receives sales data that identifies a consumer via a unique UserID and includes a list of associated products purchased by the consumer.

At block 1020, processing logic stores the product-related data and the sales data as distinct datasets in separate tables within databases of the consumer aggregation platform.

At block 1025, processing logic receives a recall notification to issue a product recall for a specified consumer product represented within the datasets of the consumer aggregation platform.

At block 1030, processing logic queries the datasets of the consumer aggregation platform to identify records for each one of: (i) the specified consumer product and (ii) consumers associated with transactions involving the specified consumer product.

At block 1035, processing logic extracts the specified consumer product records and contact information for the consumers associated with transactions involving the specified consumer product across the distinct datasets of the consumer aggregation platform.

At block 1040, processing logic joins the extracted specified consumer product records and contact information for the consumers associated with transactions based on the specific consumer product into a single data set.

At block 1045, processing logic issues the product recall via sending a push notification to consumers associated with transactions based on the specified consumer product.

According to another embodiment of method 1000, the database system includes one or more of: (i) a product manufacturing database located at a manufacturer of products, (ii) a sales and customer membership database located at a reseller of products, (iii) a product information database located at a regulatory agency, (iv) a service database located at a service provider for products, (v) a sales database located at a re-sale marketplace platform, and (vi) a financial information database located at a bank, financial services organization, or insurance company.

According to another embodiment of method 1000, issuing the product recall is performed by sending a push notification to consumers associated with transactions based on the specified consumer product includes sending a push notification to one or more of: (i) mobile devices, (ii) vehicle onboard systems, (iii) computer devices, (iv) telephones, and (v) e-mail systems.

According to another embodiment of method 1000, joining the extracted records for the specified consumer product and contact information for the consumers associated with transactions based on the specified consumer product into a single data set comprises a filtering operation to perform one or more of: (i) de-duplicating consumers associated with the specified consumer product and (ii) identifying consumers associated with transactions based on a subset variation of the specified consumer product, wherein the subset variation of the specified consumer product is based on at least one or more of: (i) manufacturer lot codes, (ii) product manufacture dates, (iii) manufacturer expiration codes, and (iv) manufacturer distribution codes.

According to another embodiment of method 1000, subset variation of the specified consumer product is based on at least one or more of: (i) manufacturer lot codes, (ii) product manufacture dates, (iii) manufacturer expiration codes, and (iv) manufacturer distribution codes.

According to another embodiment of method 1000, the received product related data is encrypted and not viewable to the consumer data aggregation platform; wherein upon a product recall event, the consumer data aggregation platform receives a key to decrypt the received product-related data and issue the product recall by sending the push notification to consumers associated with transactions based on the specified consumer product.

According to another embodiment of method 1000, the specified consumer product is a medical device and the consumers associated with transactions based on the specified consumer product are patients receiving the medical device via surgical implantation; wherein the product-related data and sales data are received from one or more of: (i) hospitals, (ii) insurance providers, (iii) medical offices, (iv) regulatory agencies, and (v) product manufacturers.

According to another embodiment of method 1000, a consumer consent request manager receives and records consumer consent to receive product recall notifications, wherein a consumer consent validator validates one or more of: (i) consent being required, (ii) whether a consumer has given consent, and (iii) whether the party sending the recall notification request is covered by the consumer's request; wherein the consumer consent manager and consumer consent validator are subject to an override mechanism wherein third-parties may send urgent notifications to consumers independent of consent settings via an emergency push interface at a data set manager communicably interfaced with an emergency alert system.

According to another embodiment of method 1000, the push notification to consumers associated with transactions based on the specified consumer product is an emergency push notification executed by authenticated third-parties via an emergency push interface at a data set manager; wherein sending the emergency push notification is independent of consumer consent settings; wherein the authenticated third-parties include one or more of: (i) governmental agencies, (ii) regulatory agencies, (iii) consumer protection groups, (iv) product manufacturers, (v) product re-sellers, (vi) product distributors, (vii) service providers, and (viii) financial services providers; wherein the emergency push notification concerns one or more of: (i) drug recall alerts, (ii) consumer product alerts, (iii) AMBER alerts, (iv) emergency weather alerts, and (v) emergency evacuation alerts.

According to another embodiment of method 1000, sending the push notification to consumers associated with transactions based on the specified consumer product includes one or more of: (i) interrupting, or (ii) taking priority over current broadcast content on mobile devices interfacing with a Synchronicity platform via a Synchronicity app on the mobile devices.

According to another embodiment of method 1000, issuing the product recall by sending a push notification to consumers associated with transactions based on the specified consumer product is triggered upon the consumer entering a geo-fence zone defining a geographic area within or in the vicinity of a seller of the specified consumer product.

According to another embodiment of method 1000, a confirmation of receipt of the product recall is obtained from consumers receiving the push notification via one or more of: (i) consumers replying to the push notification, and (ii) consumers responding to a requested read receipt indicating that they have viewed the push notification.

According to another embodiment of method 1000, upon entering a geo-fence zone, the consumer data aggregation platform performs operations comprising: identifying features within the geo-fence zone including one or more of: (i) ads, (ii) products, (iii) services, and (iv) locations; comparing the identified features with one or more of consumer data sources including: (i) consumer-specified lists, (ii) consumer purchase history, (iii) consumer specified settings, (iv) product and service review data, and (v) product recall information; and issuing notifications to consumers including one or more of: (i) suggestions to order products and services based on the consumer-specified lists and settings, (ii) feedback based on the consumer purchase history, and (iii) product recall notifications based on the product recall information and consumer purchase history.

According to another embodiment of method 1000, identifying features within the geo-fence zone is based on data received at the consumer data aggregation platform via one or more of: (i) optical recognition devices ("smart glasses"), (ii) mobile devices, (iii) vehicle onboard systems, (iii) computing devices, and (iv) satellite devices.

According to another embodiment of method 1000, further operations are performed including: receiving consumer consent to order suggested products and services based on the consumer-specified lists and settings; sending, via the consumer data aggregation platform, a request to one or more sellers of the suggested products and services located within the geo-fence zone to respond with one or more order procurement parameters including: (i) estimated order availability, (ii) estimated order preparation time for pick-up at the seller's location based on estimated time-period of consumer arrival, and (iii) estimated order preparation time for off-site delivery; receiving a response from the one or more sellers regarding the order procurement parameters; and placing an order for the suggested products and services based on the consumer-specified lists and settings.

According to another embodiment of method 1000, upon entering a geo-fence zone, the consumer data aggregation platform performs operations comprising: communicably interfacing with health devices to receive health information about a patient driver associated with the health devices; determining the occurrence of a health anomaly based on one or more of: (i) received health information, and (ii) data from real-time driving performance of the patient driver; sending a notification to the patient driver requesting confirmation of a health emergency; receiving confirmation of the health emergency from the patient driver; and performing medical assistance operations comprising one or more of: (i) overriding control of a vehicle of the patient driver, (ii) alerting contacts of the patient driver of the health emergency, (iii) alerting emergency services of the health emergency and a current location of the patient, (iv) identifying one or more healthcare facilities within the geo-fence zone, and (v) sending to a selected healthcare facility from among the one or more healthcare facilities within the geo-fence zone one or more of: (i) a notification that the patient driver is en route to the healthcare facility, and (ii) the health information about the patient driver received from the health devices.

According to another embodiment of method 1000, the health devices include one or more of a: (i) FitBit, (ii) Apple Watch, and (iii) other biometric devices; wherein determining the occurrence of a health anomaly based on the received health information includes one or more of: (i) receiving an automated emergency notification from the health devices, and (ii) comparing biometric data received from the health devices to pre-determined normal biometric parameters and determining that the biometric data is outside of the pre-determined normal biometric parameters; wherein determining the occurrence of a health anomaly based on data from real-time driving performance of the patient driver includes one or more of erratic: (i) braking, (ii) swerving, (iii) changes in acceleration, and (iv) changes in terrain; wherein the patient driver consents for the consumer data aggregation platform to identify the one or more healthcare facilities within the geo-fence zone; wherein identifying the one or more healthcare facilities within the geo-fence zone includes populating a location of the one or more healthcare facilities on a mapping app; and wherein the patient driver selects the selected healthcare facility from among the one or more healthcare facilities within the geo-fence zone identified by the consumer data aggregation platform.

According to another embodiment of method 1000, the method further comprises: receiving consumer-specified advertising preferences and consent to receive advertising content from consumers; recording the received consent to receive advertising content via a consent request manager; validating the received consent to receive advertising content via a consumer consent validator; receiving advertising content at the platform on behalf of a plurality of advertisers; and transmitting a copy of the advertising content to one or more of the consumers based on: (i) the consumer-specified advertising preferences, and (ii) a marketing campaign deployed by one of the plurality of advertisers, wherein the marketing campaign includes advertising targeting criteria, wherein transmitting the copy of the advertising content includes at least issuing a push notification to the mobile devices of any consumers matching the consumer-specified advertising preferences and advertising targeting criteria.

According to another embodiment of method 1000, consumer-specific advertising preferences are received via linked card member database information from various retailers, wherein the linked card member database information includes one or more of (i) membership rewards programs, and (ii) purchase history.

According to another embodiment of method 1000, transmitting a copy of the advertising content via push notifications to the mobile devices of consumers is triggered upon the consumer entering a geo-fence zone defining a geographic area within or in the vicinity of a retailer.

According to another embodiment of method 1000, the advertising targeting criteria includes one or more of: (i) the consumers' purchasing history and habits, (ii) estimated remaining supply of a product based on consumers' usage, and (iii) retail or manufacturer availability of a product.

According to another embodiment of method 1000, the method further comprises: securing data accessed from vehicle data systems, wherein the data includes: (i) consumer data, (ii) user health data, and (iii) vehicle data, wherein securing data from vehicle data systems includes one or more of: (i) encrypting the data, (ii) erasing the data from the vehicle data systems, and (iii) transferring the data between vehicle data systems and the consumer data aggregation platform.

According to another embodiment of method 1000, issuing a push notification includes one or more of transmitting a copy of the advertising content via: (i) SMS texts to a cell phone, (ii) e-mail messages, (iii) a podcast to a consumer's mobile device or vehicle, (iv) cell phone band based messengers, and (v) messages via social media platforms.

In accordance with a particular embodiment, there is a non-transitory computer readable storage medium, having at least a processor and a memory therein to alert consumers affected by a product recall, the instructions cause the system to perform operations including: receiving product-related data collected at a database system communicatively interfaced with the consumer data aggregation platform; receiving sales data collected at the database system communicatively interfaced with the consumer data aggregation platform, wherein the sales data identifies a consumer via a unique UserID and includes a list of associated products purchased by the consumer; storing the product-related data and the sales data as distinct datasets in separate tables within a database system of the consumer data aggregation platform; receiving a recall notification request to issue a product recall for a specified consumer product represented within the datasets of the consumer data aggregation platform; querying the datasets of the consumer aggregation platform to identify records for each one of: (i) the specified consumer product, and (ii) consumers associated with transactions based on the specified consumer product; extracting records for the specified consumer product and contact information for consumers associated with transactions based on the specified consumer product across the distinct datasets of the consumer data aggregation platform; joining the extracted records for the specified consumer product and contact information for the consumers associated with transactions based on the specified consumer product into a single data set; and issuing the product recall by sending a push notification to consumers associated with transactions based on the specified consumer product.

According to an alternative embodiment, there is a distinct method performed by a consumer data aggregation platform having at least a processor and a memory therein to alert consumers of advertising content, in which the method includes: receiving consumer-specified advertising preferences and consent to receive advertising content from consumers; recording the received consent to receive advertising content via a consent request manager; validating the received consent to receive advertising content via a consumer consent validator; receiving advertising content at the platform on behalf of a plurality of advertisers; and transmitting a copy of the advertising content to one or more of the consumers based on: (i) the consumer-specified advertising preferences, and (ii) a marketing campaign deployed by one of the plurality of advertisers, in which the marketing campaign includes advertising targeting criteria, in which transmitting the copy of the advertising content includes at least issuing a push notification to the mobile devices of any consumers matching the consumer-specified advertising preferences and advertising targeting criteria.

According to this alternative embodiment, consumer-specific advertising preferences are received via linked card member database information from various retailers, in which the linked card member database information includes one or more of (i) membership rewards programs, and (ii) purchase history.

According to another variation of this alternative embodiment, transmitting a copy of the advertising content via push notifications to the mobile devices of consumers is triggered upon the consumer entering a geo-fence zone defining a geographic area within or in the vicinity of a retailer.

According to another variation of this alternative embodiment, the advertising targeting criteria includes one or more of: (i) the consumers' purchasing history and habits, (ii) estimated remaining supply of a product based on consumers' usage, and (iii) retail or manufacturer availability of a product.

According to another variation, the alternative embodiment further includes: securing data accessed from vehicle data systems, in which the data includes: (i) consumer data, (ii) user health data, and (iii) vehicle data, in which securing data from vehicle data systems includes one or more of: (i) encrypting the data, (ii) erasing the data from the vehicle data systems, and (iii) transferring the data between vehicle data systems and the consumer data aggregation platform.

According to another variation of this alternative embodiment, issuing a push notification includes one or more of transmitting a copy of the advertising content via: (i) SMS texts to a cell phone, (ii) e-mail messages, (iii) a podcast to a consumer's mobile device or vehicle, (iv) cell phone band based messengers, and (v) messages via social media platforms.

In accordance with a particular embodiment, there is a non-transitory computer readable storage medium, having instructions stored thereupon that, when executed by a consumer data aggregation platform having at least a processor and a memory therein to alert consumers affected by a product recall, the instructions cause the system to perform operations including: receiving product-related data collected at a database system communicatively interfaced with the consumer data aggregation platform; receiving sales data collected at the database system communicatively interfaced with the consumer data aggregation platform, in which the sales data identifies a consumer via a unique UserID and includes a list of associated products purchased by the consumer; storing the product-related data and the sales data as distinct datasets in separate tables within a database system of the consumer data aggregation platform; receiving a recall notification request to issue a product recall for a specified consumer product represented within the datasets of the consumer data aggregation platform; querying the datasets of the consumer aggregation platform to identify records for each one of: (i) the specified consumer product, and (ii) consumers associated with transactions based on the specified consumer product; extracting records for the specified consumer product and contact information for consumers associated with transactions based on the specified consumer product across the distinct datasets of the consumer data aggregation platform; joining the extracted records for the specified consumer product and contact information for the consumers associated with transactions based on the specified consumer product into a single data set; and issuing the product recall by sending a push notification to consumers associated with transactions based on the specified consumer product.

Figure 11:
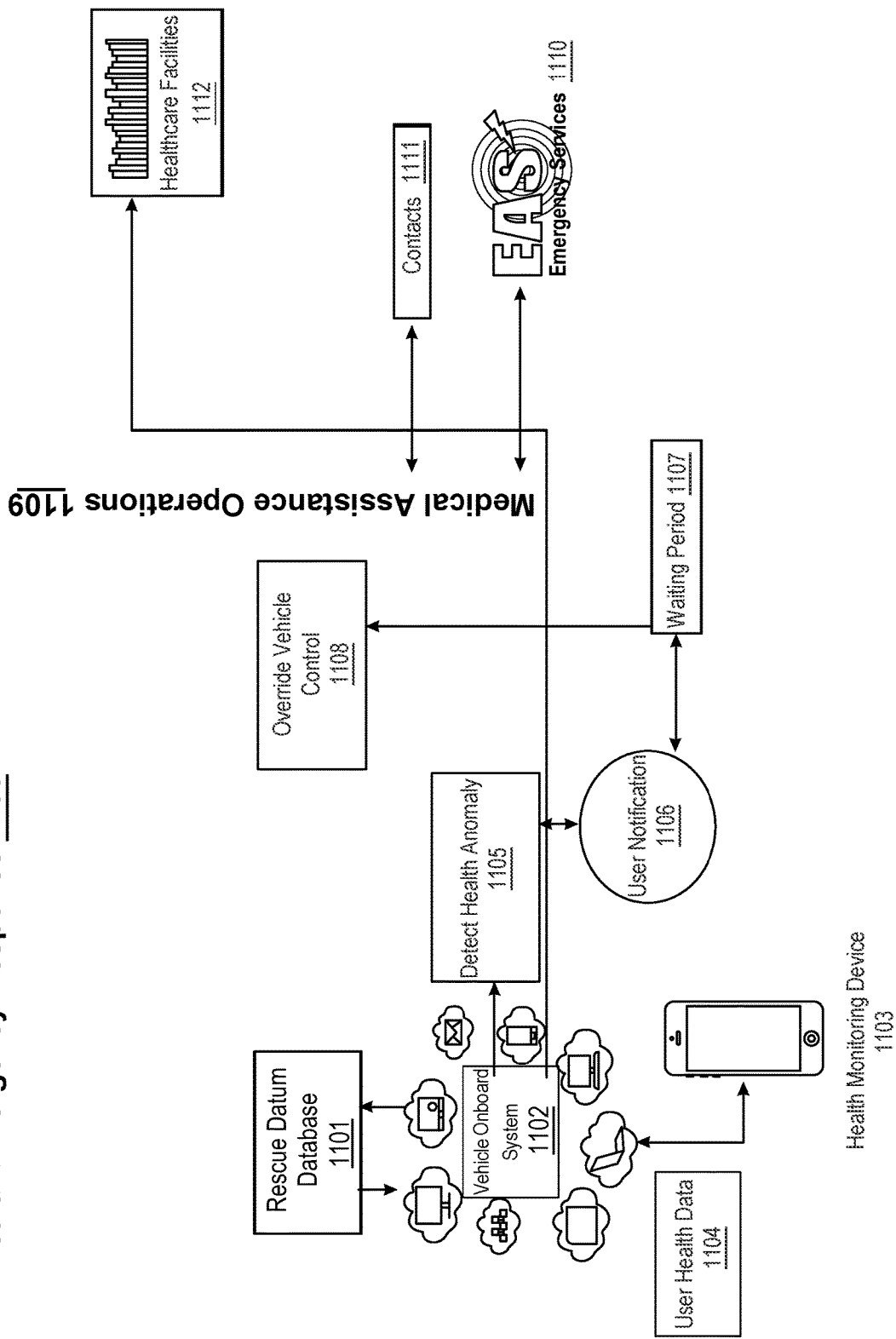
FIG. 11 illustrates exemplary details for a health emergency response model to issue notifications from the consumer data aggregator platform, in accordance with described embodiments.

FIG. 11 illustrates exemplary details for a health emergency response model to issue notifications from the consumer data aggregator platform 100, in accordance with described embodiments.

For example, a vehicle with vehicle onboard system 1102 may communicably interface with health monitoring device 1103 and rescue datum database 1101, for example via Bluetooth technology. Vehicle onboard system 1102 may receive or otherwise access user health data 1104 about a patient driver associated with health monitoring device 1103. According to various embodiments, health monitoring device may be a FitBit, Apple Watch, or other smart device that monitors and reports biometric data about a user, with the device typically being worn by or attached to the user. Biometric data may include, for example, vital signs such as: blood pressure, heart rate, pulse, and blood oxygen saturation, or other physiological indicators such as levels of vitamins, toxins, enzymes, blood cells, antibodies, inflammatory markers, etc. within the body. After receiving user health data 1104, vehicle onboard system 1102 may detect health anomaly 1105. According to various embodiments, executing the detect health anomaly 1105 operation may involve one or more of: vehicle onboard system 1102, rescue datum database 1101, and other health data and processing sources.

According to still other embodiments, detect health anomaly 1105 may be in the form of an alert sent to vehicle onboard system 1102 by health monitoring device 1103. Detect health anomaly 1105 may involve comparing received biometric data to standard ranges and values to determine that the patient driver has a health anomaly.

Detect health anomaly 1105 may also be estimated indirectly or be supplemented through indicators of patient driver driving performance that would indicate erratic driving or dangers such as vehicle swerving, abrupt deceleration and acceleration, collision, terrain changes, etc. Pursuant to detect health anomaly 1105, vehicle onboard system 1102 may prompt the patient driver to confirm whether they are experiencing a health emergency and require assistance via user notification 1106 which may be displayed as text or played as sound. According to certain embodiments, a waiting period 1107 may allow for a certain amount of time to pass for receiving a response at the consumer data aggregation platform 100 indicating a health emergency. If such a response is not received, vehicle onboard system 1102 may proceed with medical assistance operations 1109, or in certain vehicles, such as self-driving vehicles, override vehicle control 1108 may be activated which may pull the vehicle to the side of the roadway, park the vehicle, shut down the vehicle, etc. According to certain other embodiments, there is no waiting period 1107 before override vehicle control 1108 or medical assistance operations 1109 are activated. Medical assistance operations 1109 are executed by one or more of vehicle onboard system 1102 and rescue datum database 1101 to help bring medical attention or other assistance to a patient driver experiencing a health emergency. Medical assistance operations 1109 may involve alerting contacts 1111 of the patient driver, contacting emergency services 1110 such as calling 911, and contacting healthcare facilities 1112 within patient driver's geo-fence zone. According to certain embodiments, vehicle onboard system 1102 in coordination with Rescue Datum database 1101 may search for healthcare facilities 1112 within patient driver's geo-fence zone and automatically select or prompt patient driver to select a desired healthcare facility from among healthcare facilities 1112. Healthcare facilities 1112 may also be populated on a mapping app, for example via vehicle onboarding system 1102 or a mobile device associated with the patient driver. According to other embodiments, vehicle onboard system 1102, in coordination with Rescue Datum database 1101 may send the patient driver's current location and health data 1104 to healthcare facilities 1112, contacts 1111, and emergency services 1110.

Figure 12:
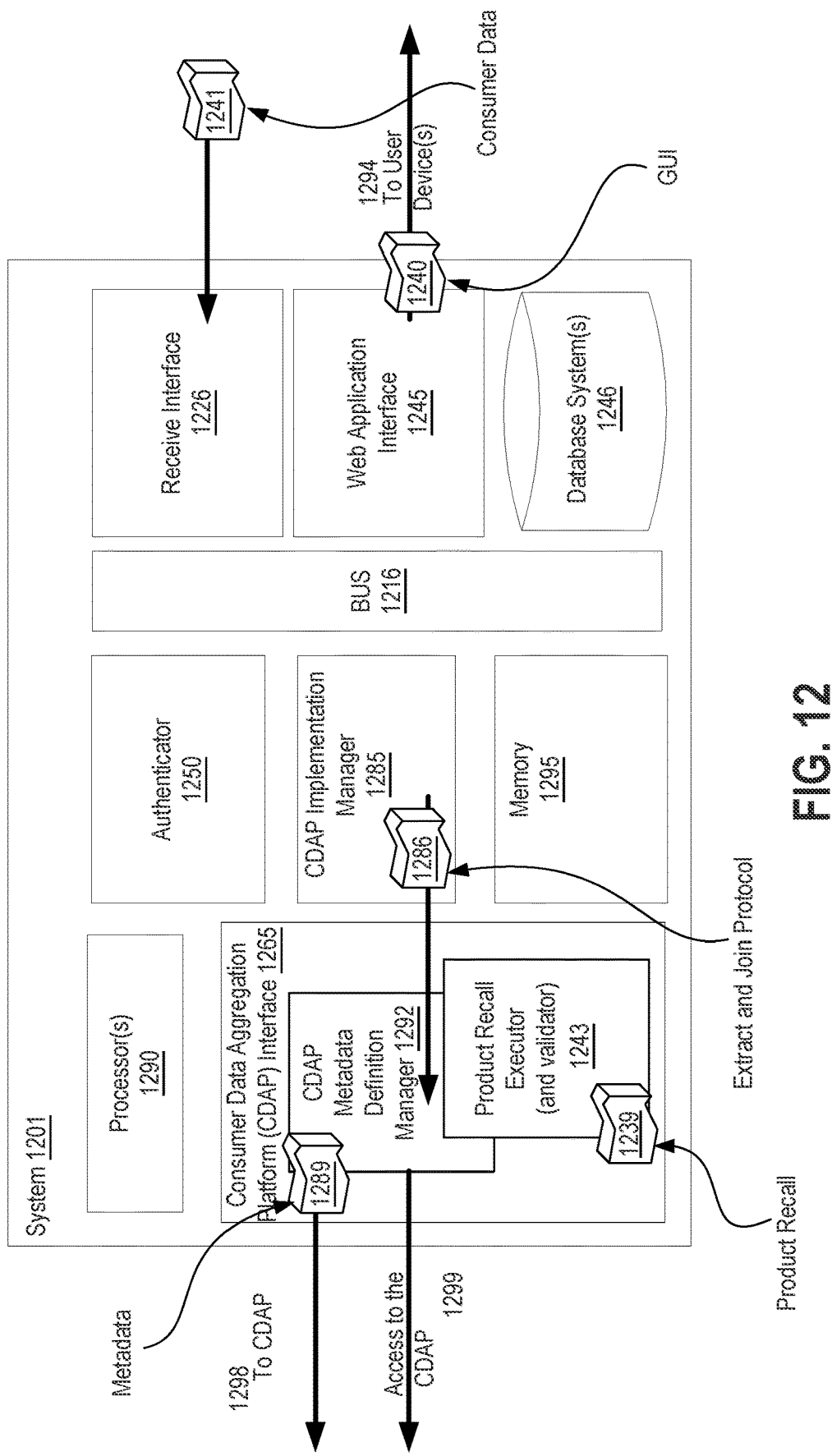
FIG. 12 shows a diagrammatic representation of a system within which embodiments may operate, be installed, integrated, or configured.

FIG. 12 shows a diagrammatic representation of a system 1201 within which embodiments may operate, be installed, integrated, or configured.

In accordance with one embodiment, there is a system 1201 having at least a processor 1290 and a memory 1295 therein to execute implementing application code for the methodologies as described herein. Such a system 1201 may communicatively interface with and cooperatively execute with the benefit of a hosted computing environment, such as a host organization, a multi-tenant environment, an on-demand service provider, a cloud-based service provider, a client-server environment, etc.

According to the depicted embodiment, system 1201, which may operate within a host organization, includes the processor 1290 and the memory 1295 to execute instructions at the system 1201. According to such an embodiment, the processor 1290 is to execute a consumer data aggregation platform interface 1265 to alert consumers of a product recall. Internal to the consumer data aggregation platform interface 1265, there is depicted the consumer data aggregation platform (CDAP) metadata definition manager 1292, depicted here as writing metadata 1289 onto the consumer data aggregation platform via its access to the consumer data aggregation platform 1299 as provided by the consumer data aggregation platform services interface 1265.

A receive interface 1226 of the system 1301 is to receive consumer data 1241 such as product and sales related data, with the sales related data identifying a consumer via a unique UserID and including a list of associated products purchased by the consumer. Such a system further includes database system(s) 1246 to store the product-related and the sales data as distinct datasets in separate tables within database system(s) 1246 of the system 1201.

Such a system further includes a product recall 1239 for a specified consumer product represented within datasets of the database system(s) 1246. Product recall 1239 is executable via the processor 1290 and the product recall executor and validator 1243 via which to validate received recall notification requests to issue a product recall 1239 before issuing the product recall 1239.

Executing product recall 1339 may involve querying datasets within database system(s) 1246 to identify records for each one of: (i) the specified consumer product, and (ii) consumers associated with transactions based on the specified consumer product. Extract and join protocol 1286 may extract the identified records across the distinct datasets of the database system(s) 1246 for the specified consumer product and contact information for the consumers associated with transactions based on the specified consumer product, and may join these records into a single data set.

Once validated, product recall 1239 may be executed by sending a push notification to user devices 1294 associated with transactions based on a specific consumer product, for example via a web application interface 1245 and GUI 1240.

According to such an embodiment of the system 1201, the receive interface 1226 may pass the product-related data and sales data contents of the consumer data 1241 to be stored within distinct datasets in separate tables persisted by the database system(s) 1246.

According to such an embodiment of the system 1201, a GUI 1240 may be pushed to the user devices 1294 via which the user devices or admin computing devices may interact with the consumer data aggregation platform (CDAP) metadata definition manager 1292.

According to another embodiment of the system 1801, the CDAP interface 1265 is to interact with and provide access to the consumer data aggregation platform (CDAP) 1299.

According to another embodiment of the system 1201, the receive interface 226 communicates with a user client device 1294 remote from the system and communicatively links the user device with the system via a public Internet. According to such an embodiment, the system operates at a host organization as a cloud-based service provider to the user device 1294; in which the cloud-based service provider hosts a receive interface 1226 exposed to the user client device via the public Internet, and further in which the receive interface receives inputs from the user device as a request for services from the cloud-based service provider. GUIs may be transmitted to the user devices 1294 via the Web Application Interface 1245.

Bus 1216 interfaces the various components of the system 1201 amongst each other, with any other peripheral(s) of the system 1201, and with external components such as external network elements, other machines, client devices, cloud computing services, etc. Communications may further include communicating with external devices via a network interface over a LAN, WAN, or the public Internet. Authenticator 1250 provides authentication services for users seeking access to the database system(s) 1246, clouds, and other services of the host organization.

While the subject matter disclosed herein has been described by way of example and in terms of the specific embodiments, it is to be understood that the claimed embodiments are not limited to the explicitly enumerated embodiments disclosed. On the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a consumer data aggregation platform having at least a processor and a memory therein to alert consumers of a product recall, wherein the method comprises:
   receiving consumer product data into a first database system communicatively interfaced with the consumer data aggregation platform;
   receiving sales data into a second database system, different than the first database system, communicatively interfaced with the consumer data aggregation platform, wherein the sales data identifies each of a plurality of consumers via respective unique consumer identification information and includes a list of associated consumer products purchased by each consumer;
   storing the consumer product data and the sales data as respective, distinct datasets in separate tables within a third database system of the consumer data aggregation platform;
   receiving a recall notification request to issue a consumer product recall alert for a specified consumer product identified in the consumer product data and the sales data stored in the distinct datasets of the consumer data aggregation platform and, responsive to receiving the recall notification request:
      querying the distinct datasets of the consumer aggregation platform to identify respective records for each one of: (i) the specified consumer product, and (ii) the consumers that purchased the specified consumer product;
      extracting from the identified records across the distinct datasets of the consumer data aggregation platform the specified consumer product and the consumer identification information for each of the consumers that purchased the specified consumer product;
      joining the extracted specified consumer product and consumer identification information for each of the consumers that purchased the specified consumer product into a single record in a consumer recall dataset;
      receiving indications as to respective consumers in the consumer recall dataset that have entered a geographic area identified by a geo-fence zone, wherein the geo-fence zone is determined via a remote user device configured to scan and identify physical markers; and
      transmitting the consumer product recall alert to the respective consumers in the consumer recall dataset that have entered the geographic area identified by the geo-fence zone by sending a push notification to the respective consumers in the consumer recall dataset that have entered the geographic area identified by the geo-fence zone.

2. The method of claim 1, wherein the first database system communicably interfaced with the consumer data aggregation platform is communicably interfaced via a public Internet, wherein the first database system is one or more of: (i) a product manufacturing database located at a manufacturer of products, (ii) a sales and customer membership database located at a reseller of products, (iii) a product information database located at a regulatory agency, (iv) a service database located at a service provider for products, (v) a sales database located at a re-sale marketplace platform, and (vi) a financial information database located at a bank, financial services organization, or insurance company.

3. The method of claim 1, wherein transmitting the consumer product recall alert to the respective consumers in the consumer recall dataset that have entered a geographic area identified by the geo-fence zone by sending a push notification to the respective consumers in the consumer recall dataset that have entered the geographic area identified by the geo-fence zone comprises sending a push notification to one or more of: (i) mobile devices, (ii) vehicle onboard systems, (iii) computer devices, (iv) telephones, and (v) e-mail systems.

4. The method of claim 1, wherein joining the extracted specified consumer product and consumer identification information for each of the consumers that purchased the specified consumer product into a single record in a consumer recall dataset comprises a filtering operation to perform one or more of: (i) de-duplicating consumers that purchased the specified consumer product and (ii) identifying consumers that purchased a subset variation of the specified consumer product, wherein the subset variation of the specified consumer product is based on at least one or more of: (i) manufacturer lot codes, (ii) product manufacture dates, (iii) manufacturer expiration codes, and (iv) manufacturer distribution codes.

5. The method of claim 1, wherein the specified consumer product is a medical device and the consumers that purchased the specified consumer product are patients receiving the medical device via surgical implantation; wherein the consumer product data and sales data are received from one or more of: (i) hospitals, (ii) insurance providers, (iii) medical offices, (iv) regulatory agencies, and (v) product manufacturers.

6. The method of claim 1, wherein a consumer consent request manager receives and records consumer consent to receive product recall notifications, wherein a consumer consent validator validates one or more of: (i) consent being required, (ii) whether a consumer has given consent, and (iii) whether the party sending the recall notification request is covered by the consumer's request; wherein the consumer consent manager and consumer consent validator are subject to an override mechanism wherein third-parties may send urgent notifications to consumers independent of consent settings via an emergency push interface at a data set manager communicably interfaced with an emergency alert system.

7. The method of claim 1, wherein the push notification is an emergency push notification executed by authenticated third-parties via an emergency push interface at a data set manager; wherein sending the emergency push notification is independent of consumer consent settings; wherein the authenticated third-parties include one or more of: (i) governmental agencies, (ii) regulatory agencies, (iii) consumer protection groups, (iv) product manufacturers, (v) product re-sellers, (vi) product distributors, (vii) service providers, and (viii) financial services providers; wherein the emergency push notification concerns one or more of: (i) drug recall alerts, (ii) consumer product alerts, (iii) AMBER alerts, (iv) emergency weather alerts, and (v) emergency evacuation alerts.

8. The method of claim 1, wherein sending the push notification comprises one or more of: (i) interrupting, or (ii) taking priority over current broadcast content on mobile devices interfacing with a communications platform via a communications app on the mobile devices.

9. The method of claim 1, wherein a confirmation of receipt of the product recall alert is obtained from consumers receiving the push notification via one or more of: (i) consumers replying to the push notification, and (ii) consumers responding to a requested read receipt indicating that they have viewed the push notification.

10. The method of claim 1, wherein upon receiving indications as to respective consumers in the consumer recall dataset that have entered the geographic area identified by the geo-fence zone, the consumer data aggregation platform performs operations comprising:
   identifying features within the geo-fence zone including one or more of: (i) ads, (ii) products, (iii) services, and (iv) locations;
   comparing the identified features with one or more of consumer data sources including: (i) consumer-specified lists, (ii) consumer purchase history, (iii) consumer specified settings, (iv) product and service review data, and (v) product recall information; and
   issuing notifications to consumers in the consumer recall dataset including one or more notifications of: (i) suggestions to order products and services based on the consumer-specified lists and settings, (ii) feedback based on the consumer purchase history, and (iii) product recall notifications based on the product recall information and consumer purchase history.

11. The method of claim 10, wherein identifying features within the geo-fence zone is based on data received at the consumer data aggregation platform via one or more of: (i) optical recognition devices, (ii) mobile devices, (iii) vehicle onboard systems, (iii) computing devices, and (iv) satellite devices.

12. The method of claim 10, further comprising:
   receiving consumer consent to order suggested products and services based on the consumer-specified lists and settings;
   sending, via the consumer data aggregation platform, a request to one or more sellers of the suggested products and services located within the geo-fence zone to respond with one or more order procurement parameters including: (i) estimated order availability, (ii) estimated order preparation time for pick-up at the seller's location based on estimated time-period of consumer arrival, and (iii) estimated order preparation time for off-site delivery;
   receiving a response from the one or more sellers regarding the order procurement parameters; and
   placing an order for the suggested products and services based on the consumer-specified lists and settings.

13. The method of claim 1, wherein upon entering a second geo-fence zone, the consumer data aggregation platform performs operations comprising:
   communicably interfacing with health devices to receive health information about a patient driver associated with the health devices;
   determining the occurrence of a health anomaly based on one or more of: (i) received health information, and (ii) data from real-time driving performance of the patient driver;
   sending a notification to the patient driver requesting confirmation of a health emergency;
   receiving confirmation of the health emergency from the patient driver; and
   performing medical assistance operations comprising one or more of:
      (i) overriding control of a vehicle of the patient driver,
      (ii) alerting contacts of the patient driver of the health emergency,
      (iii) alerting emergency services of the health emergency and a current location of the patient,
      (iv) identifying one or more healthcare facilities within the second geo-fence zone, and
      (v) sending to a selected healthcare facility from among the one or more healthcare facilities within the second geo-fence zone one or more of:
         (i) a notification that the patient driver is en route to the healthcare facility, and
         (ii) the health information about the patient driver received from the health devices.

14. The method of claim 13,
   wherein the health devices include one or more of a: (i) FitBit, (ii) Apple Watch, and (iii) other biometric devices;
   wherein determining the occurrence of a health anomaly based on the received health information includes one or more of: (i) receiving an automated emergency notification from the health devices, and (ii) comparing biometric data received from the health devices to pre-determined normal biometric parameters and determining that the biometric data is outside of the pre-determined normal biometric parameters;
   wherein determining the occurrence of a health anomaly based on data from real-time driving performance of the patient driver includes one or more of erratic: (i) braking, (ii) swerving, (iii) changes in acceleration, and (iv) changes in terrain;
   wherein the patient driver consents for the consumer data aggregation platform to identify the one or more healthcare facilities within the second geo-fence zone;
   wherein identifying the one or more healthcare facilities within the second geo-fence zone includes populating a location of the one or more healthcare facilities on a mapping app; and
   wherein the patient driver selects the selected healthcare facility from among the one or more healthcare facilities within the second geo-fence zone identified by the consumer data aggregation platform.

15. A system to execute at a consumer data aggregation platform to alert consumers of a product recall, wherein the system comprises:
   a memory to store instructions;
   a set of one or more processors that execute the instructions stored in the memory to cause the system to perform operations comprising:
   receiving consumer product data collected at a first database system communicatively interfaced with the consumer data aggregation platform;
   receiving sales data collected at a second database system, different than the first database system, communicatively interfaced with the consumer data aggregation platform, wherein the sales data identifies each of a plurality of consumers via respective unique consumer identification information and includes a list of associated consumer products purchased by each consumer;

storing the consumer product data and the sales data as respective, distinct datasets in separate tables within a third database system of the consumer data aggregation platform;

receiving a recall notification request to issue a consumer product recall alert for a specified consumer product identified in the consumer product data and the sales data stored in the distinct datasets of the consumer data aggregation platform and, responsive to receiving the recall notification request:

querying the distinct datasets of the consumer aggregation platform to identify respective records for each one of: (i) the specified consumer product, and (ii) the consumers that purchased the specified consumer product;

extracting from the identified records across the distinct datasets of the consumer data aggregation platform the specified consumer product and the consumer identification information for each of the consumers that purchased the specified consumer product;

joining the extracted specified consumer product and consumer identification information for each of the consumers that purchased the specified consumer product into a single record in a consumer recall dataset;

receiving indications as to respective consumers in the consumer recall dataset that have entered a geographic area identified by a geo-fence zone, wherein the geo-fence zone is determined via a remote user device configured to scan and identify physical markers; and transmitting the consumer product recall alert to the respective consumers in the consumer recall dataset that have entered the geographic area identified by the geo-fence zone by sending a push notification to the respective consumers in the consumer recall dataset that have entered the geographic area identified by the geo-fence zone.

16. The system of claim 15:

wherein the consumer data aggregation platform implements on-demand cloud computing services provided to subscribers of the consumer data aggregation platform; and wherein users of the consumer data aggregation platform having subscriber access to the on-demand cloud computing services provided by a cloud computing platform communicating with the consumer data aggregation platform from remote user devices operating separate and distinct from the consumer data aggregation platform and communicate with the consumer data aggregation platform over a public Internet.

17. Non-transitory computer readable storage media having instructions stored thereupon that, when executed by a consumer data aggregation platform having at least a processor and a memory therein to alert consumers affected by a product recall, the instructions cause the system to perform operations including:

receiving consumer product data collected at a first database system communicatively interfaced with the consumer data aggregation platform;

receiving sales data collected at a second database system, different than the first database system, communicatively interfaced with the consumer data aggregation platform, wherein the sales data identifies each of a plurality of consumers via unique consumer identification information and includes a list of associated consumer products purchased by the consumer;

storing the consumer product data and the sales data as respective, distinct datasets in separate tables within a third database system of the consumer data aggregation platform;

receiving a recall notification request to issue a consumer product recall for a specified consumer product identified in the consumer product data and the sales data stored in the distinct datasets of the consumer data aggregation platform and, responsive to receiving the recall notification request:

querying the distinct datasets of the consumer aggregation platform to identify respective records for each one of: (i) the specified consumer product, and (ii) the consumers that purchased the specified consumer product;

extracting from the identified records across the distinct datasets of the consumer data aggregation platform the specified consumer product and consumer identification information for each of the consumers that purchased the specified consumer product;

joining the extracted specified consumer product and consumer identification information for each of the consumers that purchased the specified consumer product into a single record in a consumer recall dataset;

receiving indications as to respective consumers in the consumer recall dataset that have entered a geographic area identified by a geo-fence zone, wherein the geo-fence zone is determined via a remote user device configured to scan and identify physical markers; and transmitting the consumer product recall alert to the respective consumers in the consumer recall dataset that have entered the geographic area identified by the geo-fence zone by sending a push notification to the respective consumers in the consumer recall dataset that have entered the geographic area identified by the geo-fence zone.

18. The non-transitory computer readable storage media of claim 17:

wherein the consumer data aggregation platform implements on-demand cloud computing services provided to subscribers of the consumer data aggregation platform; and wherein users of the consumer data aggregation platform having subscriber access to the on-demand cloud computing services provided by a cloud computing platform communicating with the consumer data aggregation platform from remote user devices operating separate and distinct from the consumer data aggregation platform and communicate with the consumer data aggregation platform over a public Internet.

\* \* \* \* \*